United States Patent
Ito

(10) Patent No.: US 10,626,827 B2
(45) Date of Patent: Apr. 21, 2020

(54) VEHICLE CONTROL DEVICE

(71) Applicant: TOYOTA JIDOSHA KABUSHIKI KAISHA, Toyota-shi (JP)

(72) Inventor: Hironori Ito, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/147,914

(22) Filed: Oct. 1, 2018

(65) Prior Publication Data
US 2019/0162139 A1 May 30, 2019

(30) Foreign Application Priority Data
Nov. 29, 2017 (JP) .................................. 2017-229353

(51) Int. Cl.
| F02D 41/04 | (2006.01) |
| F02M 26/50 | (2016.01) |
| F02M 26/47 | (2016.01) |
| F02D 41/00 | (2006.01) |
| F02M 26/35 | (2016.01) |
| F02M 26/00 | (2016.01) |

(52) U.S. Cl.
CPC ......... *F02M 26/50* (2016.02); *F02D 41/0065* (2013.01); *F02D 41/0077* (2013.01); *F02D 41/042* (2013.01); *F02M 26/35* (2016.02); *F02M 26/47* (2016.02); *F02D 41/0055* (2013.01); *F02D 2200/021* (2013.01); *F02D 2200/0418* (2013.01); *F02D 2200/101* (2013.01); *F02M 2026/001* (2016.02)

(58) Field of Classification Search
CPC ............. F02D 41/0077; F02D 41/0065; F02D 41/042; F02D 41/0055; F02D 2200/0418; F02D 2200/021; F02D 2200/101; F02M 26/50; F02M 26/47
USPC ......... 123/568.21, 568.22; 701/108
See application file for complete search history.

(56) References Cited

U.S. PATENT DOCUMENTS 9,494,066 B2 * 11/2016 Miyake .................. F02M 26/47
2014/0130483 A1 5/2014 Miyake

FOREIGN PATENT DOCUMENTS

| EP | 2 716 892 A1 | 4/2014 |
| JP | 2010-59921 | 3/2010 |
| JP | 2015-203309 | 11/2015 |

* cited by examiner

*Primary Examiner* — Hai H Huynh
(74) *Attorney, Agent, or Firm* — Oblon, McClelland, Maier & Neustadt, L.L.P.

(57) ABSTRACT

A vehicle control device controls a vehicle that includes an actuator capable of generating a gas flow at a scavenging target portion of an internal combustion engine during an engine stop. The vehicle control device is configured, when at least one of a specified temperature condition and a specified humidity condition is met after the engine stop, to execute a scavenging control. The specified temperature condition is that, after the engine stop, a temperature correlation value correlated with the temperature of the scavenging target portion is higher than that at the engine stop time point. The specified humidity condition is that, after the engine stop, a humidity correlation value correlated with the absolute humidity of the gas at the scavenging target portion is higher than that at the engine stop time point. The scavenging control operates the actuator to cause the gas flow at the scavenging target portion.

11 Claims, 16 Drawing Sheets

VEHICLE CONTROL DEVICE

CROSS-REFERENCE TO RELATED APPLICATION

This application is based on and claims the benefit of Japanese Patent Application No. 2017-229353, filed on Nov. 29, 2017, which is incorporated by reference herein in its entirety.

BACKGROUND

Technical Field

The present disclosure relates to a vehicle control device, and more particularly to a vehicle control device for controlling a vehicle on which an internal combustion engine is mounted.

Background Art

For example, JP 2010-059921 A discloses an EGR control device for an internal combustion engine. In this EGR control device, an EGR valve and a throttle valve are controlled such that, when an engine stop request is made, EGR gas in a channel through which the EGR gas flows is scavenged. This can prevent the combustion at the time of a re-start of the engine from becoming unstable due to a condensed water that is produced from a residual EGR gas during a stop of the internal combustion engine.

SUMMARY

As already described, according to the control disclosed in JP 2010-059921 A, the occurrence of a condensed water from gas including water that remains in an EGR passage in a gas state when a request to stop the internal combustion engine is made can be reduced after the stop.

On the other hand, during a stop of an internal combustion engine, a condensed water that has already been generated before the stop (i.e., water in a liquid state) may also be present at a portion of a flow passage in which a gas (such as, intake air or EGR gas) that flows through the internal combustion engine flows. The water (condensed water) that is present in a liquid state in this way is attached to the portion described above by a surface tension. Because of this, in order to remove the condensed water by the use of a gas flow, an extremely high gas flow velocity is required. Therefore, according to the method of using a gas flow that is generated in the stopping process until the engine speed becomes zero after an engine stop request is made similarly to the control disclosed in JP 2010-059921 A, it is difficult to effectively remove the condensed water described above.

The present disclosure has been made to address the problem described above, and an object of the present disclosure is to provide a vehicle control device that can effectively remove, after a stop of an internal combustion engine, a condensed water (water in a liquid state) that was already produced before the stop.

A vehicle control device according to the present disclosure is configured to control a vehicle that includes an actuator capable of generating a gas flow at a scavenging target portion of an internal combustion engine during a stop of the internal combustion engine.

The scavenging target portion is a portion in which: a gas that flows through the internal combustion engine is possible to flow; a condensed water is possible to be present at a stop time point of the internal combustion engine; and a temperature increase is possible to be produced due to heat received from a main body of the internal combustion engine after the stop of the internal combustion engine.

The vehicle control device is configured, when at least one of a specified temperature condition and a specified humidity condition is met after the stop of the internal combustion engine, to execute a scavenging control.

The specified temperature condition is that, after the stop of the internal combustion engine, a temperature correlation value correlated with a temperature of the scavenging target portion is higher than the temperature correlation value at the stop time point.

The specified humidity condition is that, after the stop of the internal combustion engine, a humidity correlation value correlated with an absolute humidity of a gas at the scavenging target portion is higher than the humidity correlation value at the stop time point.

The scavenging control operates the actuator to cause the gas flow at the scavenging target portion.

The vehicle control device may be configured to start the scavenging control when, after the stop of the internal combustion engine, the temperature correlation value becomes higher than a first temperature-threshold value that is higher than the temperature correlation value at the stop time point.

The vehicle control device may be configured to start the scavenging control when, after the stop of the internal combustion engine, the humidity correlation value becomes higher than a humidity-threshold value that is higher than the humidity correlation value at the stop time point.

When compared under a condition that the humidity correlation value at the stop time point is constant, the humidity-threshold value may be higher when the temperature correlation value is higher, than when the temperature correlation value is lower.

The vehicle control device may be configured to start the scavenging control when the temperature correlation value becomes the highest after the stop of the internal combustion engine.

The vehicle control device may be configured to start the scavenging control when the humidity correlation value becomes the highest after the stop of the internal combustion engine.

The vehicle control device may be configured to start the scavenging control when, after the stop of the internal combustion engine, a duration in which the temperature correlation value is higher than a second temperature-threshold value that is higher than the temperature correlation value at the stop time point becomes longer than a first time-threshold value.

The vehicle control device may be configured to start the scavenging control when, after the stop of the internal combustion engine, an elapsed time from the stop time point reaches a second time-threshold value at which at least one of the specified temperature condition and the specified humidity condition is met.

When a main body temperature correlation value that is correlated with a temperature of the main body of the internal combustion engine at the stop time point is higher, the second time-threshold value may be shorter than when the main body temperature correlation value is lower.

The vehicle control device may be configured to start the scavenging control when an evaporation speed correlation value that is correlated with an evaporation speed of the gas at the scavenging target portion becomes lower than a speed-threshold value.

The internal combustion engine may include an EGR device having an EGR passage that connects an exhaust gas passage with an intake air passage, and an EGR valve that opens and closes the EGR passage. A portion of the EGR device may correspond to the scavenging target portion. The actuator may include the EGR valve. The vehicle control device may be configured to open the EGR valve when executing the scavenging control.

According to the vehicle control device of the present disclosure, the scavenging control that operates the actuator to cause a gas flow at the scavenging target portion is executed when at least one of the specified temperature condition and the specified humidity condition is met after the stop of the internal combustion engine. This makes it possible to execute the scavenging control when the evaporation of the water is promoted at the scavenging target portion in association with a temperature increase after the stop of the internal combustion engine. Therefore, a condensed water (water in a liquid state) that was already generated before the stop of the internal combustion engine can be effectively removed after the stop.

DETAILED DESCRIPTION

Figure 1:
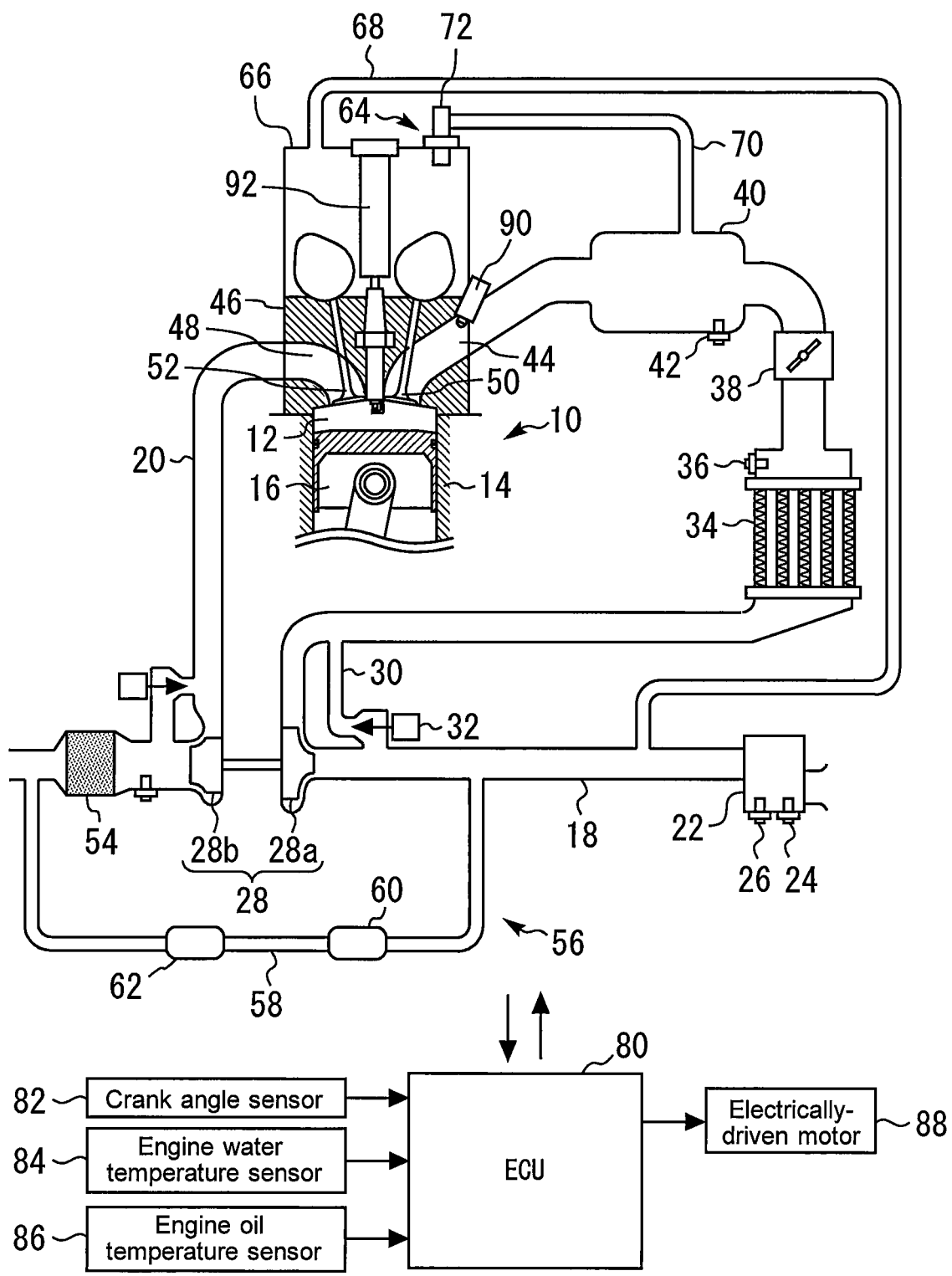
FIG. 1 is a diagram for describing the configuration of a system according to a first embodiment of the present disclosure.

It is to be understood that even when the number, quantity, amount, range or other numerical attribute of an element is mentioned in the following description of embodiments, the present disclosure is not limited to the mentioned numerical attribute unless explicitly described otherwise, or unless the present disclosure is explicitly specified by the numerical attribute theoretically. Moreover, structures or steps or the like that are described in conjunction with the following embodiments are not necessarily essential to the present disclosure unless explicitly shown otherwise, or unless the present disclosure is explicitly specified by the structures, steps or the like theoretically. In addition, elements that are the same as each other in the drawings that are referred to in each embodiment are denoted by the same reference symbols, and redundant descriptions of those elements will be omitted or simplified.

First Embodiment

Firstly, a first embodiment according to the present disclosure will be described with reference to FIGS. 1 to 4.

1-1. Example of Configuration of System

FIG. 1 is a diagram for describing the configuration of a system according to the first embodiment of the present disclosure. The system according to the present embodiment includes an internal combustion engine (as an example, a spark-ignition type gasoline engine) 10. The internal combustion engine 10 is provided with a cylinder block 14 in which a plurality of (for example, four) cylinders 12 are formed. The number and arrangement of cylinders of the internal combustion engine 10 are not particularly limited to the foregoing. Inside each of the cylinders 12, a piston 16 is arranged. An intake air passage 18 and an exhaust gas passage 20 communicate with each cylinder 12.

An air cleaner 22 is provided in the vicinity of an inlet of the intake air passage 18. An air flow sensor 24 and a temperature sensor 26 are attached to the air cleaner 22. The air flow sensor 24 outputs a signal responsive to the flow rate of the air (intake air) that is suctioned into the intake air passage 18. The temperature sensor 26 outputs a signal responsive to the temperature of the intake air that is suctioned into the intake air passage 18.

The internal combustion engine 10 is equipped with a turbo-supercharger 28 as an example of a supercharger. A compressor 28*a* of the turbo-supercharger 28 is installed in a portion of the intake air passage 18 located on the downstream side of the air cleaner 22. The compressor 28*a* is integrally coupled to a turbine 28*b* disposed in the exhaust gas passage 20 by a coupling shaft. Also, an air bypass passage 30 that bypasses the compressor 28*a* is connected to the intake air passage 18. An air bypass valve (ABV) 32 that opens and closes this air bypass passage 30 is installed in the air bypass passage 30.

An intercooler 34, which cools the intake air compressed by the compressor 28*a*, is installed in a portion of the intake air passage 18 located on the downstream side of the compressor 28*a*. The intercooler 34 is a water-cooled type as an example and is a heat exchanger that causes heat exchange between the intake air and a cooling water. A humidity sensor 36 is attached to the intercooler 34. The humidity sensor 36 outputs a signal responsive to the humidity (in more detail, the absolute humidity) of the gas in the intercooler 34.

An electronically controlled throttle valve 38 is installed in a portion of the intake air passage 18 located on the downstream side of the intercooler 34. An intake manifold 40 is provided on the downstream side of the throttle valve 38. Passages in the intake manifold 40 serve as a part of the intake air passage 18. A temperature sensor 42 that outputs a signal responsive to the temperature of the intake air that flows through this position is attached to a connecting portion (surge tank) of the intake manifold 40.

The intake air that flows through the intake air passage 18 is distributed into intake ports 44 of the respective cylinders 12 by the intake manifold 40. Exhaust ports 48 are formed in the cylinder head 46 as well as the intake ports 44. The intake ports 44 serve as a part of the intake air passage 18, and the exhaust ports 48 serve as a part of the exhaust gas passage 20. The intake ports 44 and the exhaust ports 48 are opened and closed by intake valves 50 and exhaust valves 52, respectively. In addition, an exhaust gas purification catalyst (as an example, three-way catalyst) 54 for purifying the exhaust gas that is discharged from each cylinder 12 is installed in a portion of the exhaust gas passage 20 located on the downstream side of the turbine 28*b*.

The internal combustion engine 10 also includes, as an example, a low pressure loop (LPL) type EGR device 56 in order to supply EGR gas with each cylinder 12. An EGR passage 58 of this EGR device 56 is adapted to connect a portion of the exhaust gas passage 20 located on the downstream side of the exhaust gas purification catalyst 54 and a portion of the intake air passage 18 located on the upstream side of the compressor 28*a* to each other. An EGR valve 60 that opens and closes the EGR passage 58 and an EGR cooler 62 are installed in the EGR passage 58.

Moreover, the internal combustion engine 10 is equipped with a positive crankcase ventilation system 64 for returning blow-by gas to the intake air passage 18. The blow-by gas is a gas which flows into a crankcase from the combustion chamber through a gap between a cylinder wall surface and the piston 16 in each cylinder 12. As an example of passages through which the blow-by gas flows, the positive crankcase ventilation system 64 includes: a passage (not shown) that communicates with the inside of the crankcase and the inside of a cylinder head cover 66; a fresh air introduction passage 68; and a breather passage 70. In addition, a PCV (Positive Crankcase Ventilation) valve 72 is attached to the breather passage 70. It should be noted that, as an example, the PCV valve 72 is configured so as to be actuated in accordance with a difference in pressure between the inside of the cylinder head cover 66 and a portion of the intake air passage 18 located on the downstream thereof.

As shown in FIG. 1, the system according to the present embodiment is further provided with an electronic control unit (ECU) 80. Various sensors installed in the internal combustion engine 10 and the vehicle on which the internal combustion engine 10 is mounted and various actuators for controlling the operation of the internal combustion engine 10 and the vehicle are electrically connected to the ECU 80.

The various sensors described above include a crank angle sensor 82, an engine water temperature sensor 84 and an engine oil temperature sensor 86 as well as the air flow sensor 24, the temperature sensors 26, 42 and the humidity sensor 36 that are described above. The crank angle sensor 82 outputs a signal responsive to the crank angle. The ECU 80 can obtain an engine speed Ne by the use of this signal. The engine water temperature sensor 84 is typically attached to the cylinder block 14, and outputs a signal responsive to an engine water temperature. The engine oil temperature sensor 86 is typically attached to an oil pan (not shown), and outputs a signal responsive to an engine oil temperature. Moreover, the various actuators described above include an electrically-driven motor 88 that serves as a power source of the vehicle as well as the internal combustion engine 10, fuel injection valves 90 and an ignition device 92, as well as the ABV 32, the throttle valve 38 and the EGR valve 60 that are described above.

The ECU 80 includes a processor, a memory, and an input/output interface. The input/output interface receives sensor signals from the various sensors described above, and also outputs actuating signals to the various actuators described above. In the memory, various control programs and maps for controlling the various actuators are stored. The processor reads out a control program from the memory and executes the control program. As a result, functions of the "vehicle control device" according to the present embodiment are achieved.

1-2. Control During Engine Stop According to First Embodiment

The internal combustion engine 10 includes, in the interior thereof, a portion through which gas that flows through the internal combustion engine 10 flows. An example of this kind of portion is the intercooler 34 through which the intake air (or the mixed gas of the intake gas and the EGR gas) flows. If a state in which a large amount of condensed water is present in the intercooler 34 during an engine stop is kept for a long period of time, there is a concern that corrosion or freezing may be produced inside the intercooler 34.

Accordingly, in the present embodiment, a "scavenging control" for removing the condensed water from the interior of the intercooler 34 after an engine stop. That is, an example of the "scavenging target portion" according to the present embodiment is the intercooler 34. This scavenging control actuates a predetermined actuator to produce a gas flow in the scavenging target portion.

In more detail, according to the present embodiment, the electrically-driven motor 88 and the throttle valve 38 are used as an example of the actuator described above. Specifically, the scavenging control rotates the crankshaft of the internal combustion engine 10 by operating the electrically-driven motor 88 during an engine stop and opens the throttle valve 38, in order to produce a gas flow in the intake air passage 18 including the intercooler 34.

1-2-1. Problem on Removal of Condensed Water that was Already Produced Before Engine Stop When the internal combustion engine 10 is stopped, water in both states of "liquid" and "gas" may be present inside the internal combustion engine 10. As compared to the water that is present in a gas state, the water that is present in a liquid state (i.e., condensed water) is more highly likely to be present at a certain portion (for example, intercooler 34) and the amount of the condensed water generally becomes greater. In order to reduce the corrosion or freezing of component parts of the internal combustion engine 10, it is favorable to remove the water that is present in a liquid state in this way. However, the condensed water is attached to the wall surface by a surface tension. In order to remove this kind of condensed water by the use of a gas flow, an extremely high gas flow velocity is required. Thus, it is required for the execution of the scavenging control to be able to effectively remove a condensed water (water in a liquid state) that was already produced before an engine stop, without relying on increasing the velocity of a gas flow that is produced by the scavenging control.

1-2-2. Execution Condition for Scavenging Control (Temperature Correlation Value>Threshold Value TH1)

In view of the problem described above, the scavenging control according to the present embodiment is executed in accordance with an execution condition as described below. That is, broadly speaking, the scavenging control is executed when a "specified temperature condition" is met after an engine stop. This specified temperature condition means that a "temperature correlation value" that is correlated with the temperature of the scavenging target portion (in the present embodiment, intercooler 34) after an engine stop is higher than the temperature correlation value at an "engine stop time point". It should be noted that the engine stop time point is equivalent to the time point at which the rotation of the crankshaft has stopped.

Figure 2:
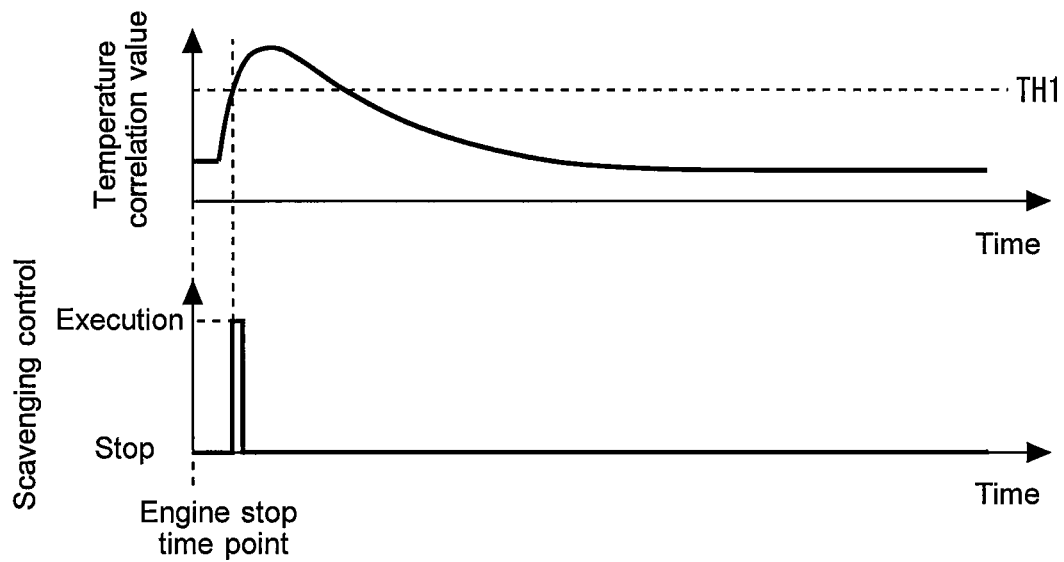
FIG. 2 is a time chart for describing an execution condition for a scavenging control according to the first embodiment of the present disclosure.

FIG. 2 is a time chart for describing the execution condition for the scavenging control according to the first embodiment of the present disclosure. According to the present embodiment, an engine water temperature (hereunder, also simply referred to as a "water temperature") obtained by the use of the engine water temperature sensor 84 is used as an example of the temperature correlation value that is correlated with the temperature of the intercooler 34.

As shown in FIG. 2, when an engine stop is performed, basically, the temperature of the intercooler 34 and the water temperature correlated therewith once increase by the effect of the heat received from the main body of the internal combustion engine 10 (mainly, cylinder block 14 and cylinder head 46) and, thereafter, continues to decrease (converges) to the outside air temperature. According to the scavenging control of the present embodiment, the scavenging control is started when the water temperature becomes higher than the threshold value TH1 (which corresponds an example to a "first temperature-threshold value" according to the present disclosure) as shown in FIG. 2.

Figure 3:
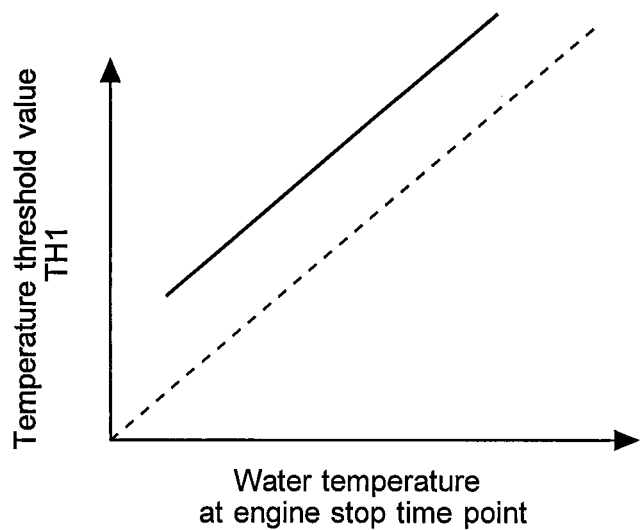
FIG. 3 is a graph that illustrates an example of the setting of a threshold value TH1 (first temperature-threshold value) of a temperature correlation value.

FIG. 3 is a graph that illustrates an example of the setting of the threshold value TH1 of the temperature correlation value. As shown in FIG. 3, the threshold value TH1 is set so as to become higher than the temperature correlation value (water temperature) at the engine stop time point. According to the present embodiment, by the use of this kind of threshold value TH1, the scavenging control can be performed when the specified temperature condition described above is met after an engine stop. In addition, the scavenging control is not started immediately at the engine stop time point but started at a timing that is later than the engine stop time point.

Moreover, as shown in FIG. 3, when the water temperature at the engine stop time point is lower, the threshold value TH1 is set so as to be lower than when the water temperature is higher. When the water temperature at the engine stop time point becomes lower, a peak value of the water temperature obtained when a temperature increase is produced immediately after an engine stop as shown in FIG. 2 also becomes lower. This kind of setting can therefore properly determine that, regardless of a difference of the water temperature at the engine stop time point, the water temperature has increased after an engine stop.

A predetermined time period as described below is used as an example of execution time period of the scavenging control. Specifically, this predetermined time period is determined in advance as a time period that is required for the gas around the scavenging target portion (inside the intercooler 34) to be replaced by the fresh air (that is, the air that is taken into the intake air passage 18 during execution of the scavenging control). To be more specific, the predetermined time period is a time period required for the gas equivalent to the volume of the intake air passage 18 from the inlet (air cleaner 22) of the intake air passage 18 to the intercooler 34 to be replaced by the fresh air. Because of this, the predetermined time period is short. It should be noted that the waveform of the water temperature in FIG. 2 does not represent a drop in water temperature associated with the execution of the scavenging control. This also applies to FIGS. 11 and 13 described later.

1-2-3. Processing of ECU Concerning Scavenging Control

Figure 4:
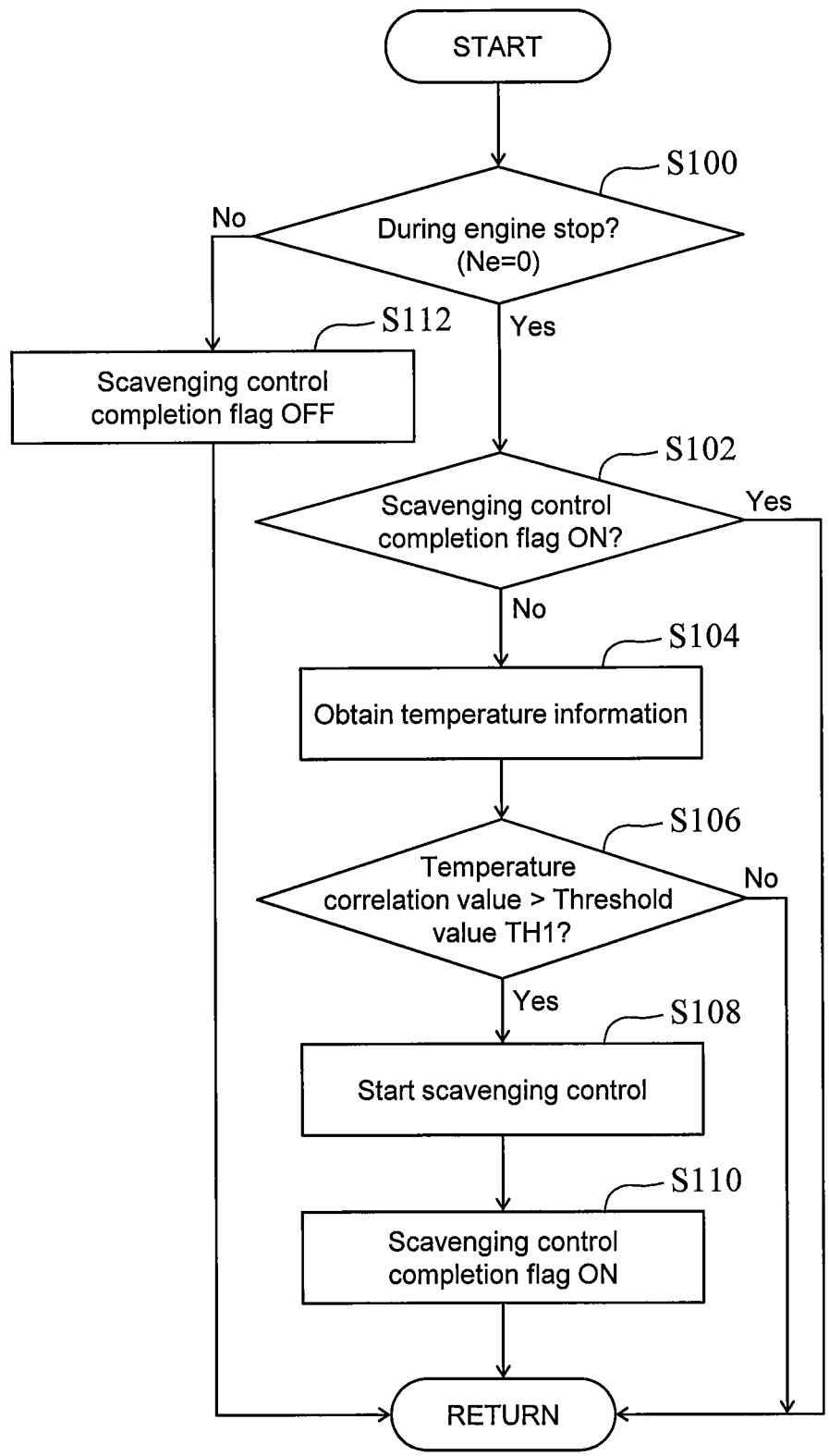
FIG. 4 is a flow chart that illustrates a routine of the processing concerning the scavenging control according to the first embodiment of the present disclosure.

FIG. 4 is a flow chart that illustrates a routine of the processing concerning the scavenging control according to the first embodiment of the present disclosure. The ECU 80 repeatedly executes the present routine at a predetermined time interval (for example, the order of seconds).

According to the routine shown in FIG. 4, the ECU 80 determines whether or not the internal combustion engine 10 is in a stopped state, on the basis of whether or not the engine speed Ne is zero (step S100). If the ECU 80 determines that the internal combustion engine 10 is not in a stopped state, it ends the current processing cycle after proceeding to step S112 to turn OFF a scavenging control completion flag (or after maintaining an OFF state).

If, on the other hand, the internal combustion engine 10 is in a stopped state, the ECU 80 next determines whether or not the scavenging control completion flag is ON (step S102). As a result, if the scavenging control completion flag is ON, the ECU 80 ends the current processing cycle, and, on the other hand, if the scavenging control completion flag is OFF, the ECU 80 proceeds to step S104.

In step S104, the ECU 80 obtains a temperature information on the scavenging target portion. The scavenging target portion according to the present embodiment is the intercooler 34. Accordingly, the engine water temperature that is an example of the temperature correlation value that is correlated with the temperature of the intercooler 34 is obtained by the use of the engine water temperature sensor 84. It should be noted that an example of the temperature correlation value obtained may alternatively be the temperature of the intercooler 34 itself (for example, its wall temperature or gas temperature therein). The temperature of the intercooler 34 may be detected by the use of a temperature sensor, or may be, for example, estimated on the basis of one or more parameters associated with the temperature of the intercooler 34, such as the intake air temperature (temperature of the gas in the intake manifold 40) obtained by the use of the temperature sensor 42.

Next, the ECU 80 determines whether or not the temperature correlation value (water temperature) obtained in step S104 is higher than the threshold value TH1 (for example, 80 degrees Celsius) (step S106). The ECU 80 stores a map that defines a relationship as shown in FIG. 3, that is, a relationship between the water temperature at the engine stop time point and the threshold value TH1, and obtains the threshold value TH1 depending on the water temperature at the engine stop time point with reference to this kind of map. If the determination result of step S106 is negative, the ECU 80 ends the current processing cycle.

If, on the other hand, the determination result of step S106 has become positive, that is, if the water temperature has exceeded the threshold value TH1 after an engine stop, the ECU 80 proceeds to step S108. In step S108, in order to produce a gas flow inside the intake air passage 18 in which the intercooler 34 that is the scavenging target portion is installed, the ECU 80 executes (starts) the scavenging control using, as actuator, the electrically-driven motor 88 and the throttle valve 38. The scavenging control is executed over a predetermined time period as already described.

After executing the processing of step S108, the ECU 80 proceeds to step S110 to turn ON the scavenging control completion flag. According to the processing of step S102, the scavenging control is no longer executed after the scavenging control completion flag is turned ON during an engine stop. In this way, according to the present routine, the scavenging control is once executed during an engine stop.

1-2-4. Advantageous Effects of Scavenging Control

If the condensed water has been present inside the intercooler 34 since before an engine stop, this condensed water becomes easy to be evaporated due to a temperature increase of the intercooler 34 after an engine start-up. If the scavenging control is not executed, evaporation of this condensed water proceeds due to the temperature increase, and the condensed water is then condensed again in association with a temperature decrease of the intercooler 34.

As described above, the scavenging control according to the present embodiment is started when, after an engine stop, the water temperature reaches the threshold value TH1 that is higher than the water temperature at the engine stop time point. In other words, the scavenging control is started after the temperature of the intercooler 34 becomes higher than the value at an engine stop time point after the engine stop. Because of this, the scavenging control can be performed when the evaporation of the water in the intercooler 34 is promoted due to a temperature increase after the engine stop. Thus, a high humidity gas (i.e., the gas including the evaporated water) that is present in the vicinity of the intercooler 34 can be scavenged by the use of a gas flow (flow of the intake air) that is produced by the scavenging control. Therefore, the condensed water (water in a liquid state) that was already produced in the intercooler 34 before the engine stop can be effectively removed without relying on an increase of the velocity of the gas flow.

Second Embodiment

Next, a second embodiment according to the present disclosure and its modification examples will be described with reference to FIGS. 5 to 10. It should be noted that, in the following description, the configuration shown in FIG. 1 is supposed to be used as an example of the configuration of a system according to the second embodiment. This also applies to third to eights embodiments described later.

2-1. Control During Engine Stop According to Second Embodiment

A scavenging target portion used in a scavenging control according to the present embodiment is also the intercooler 34. However, the scavenging control according to the present embodiment is different from the scavenging control according to the first embodiment in terms of their execution conditions. Specifically, the scavenging control according to the present embodiment is, broadly speaking, executed when a "specified humidity condition", instead of the specified temperature condition described above, is met after an engine stop. This specified humidity condition means that, after an engine stop, a "humidity correlation value" that is correlated with the absolute humidity of the gas around the scavenging target portion (intercooler 34) is higher than the humidity correlation value at the engine stop time point. An example of the humidity correlation value used in the present embodiment is the absolute humidity itself of the gas in the intercooler 34 and is detected by the use of the humidity sensor 36.

2-1-1. Execution Condition for Scavenging Control (Humidity Correlation Value>Threshold Value TH2)

Figure 5:
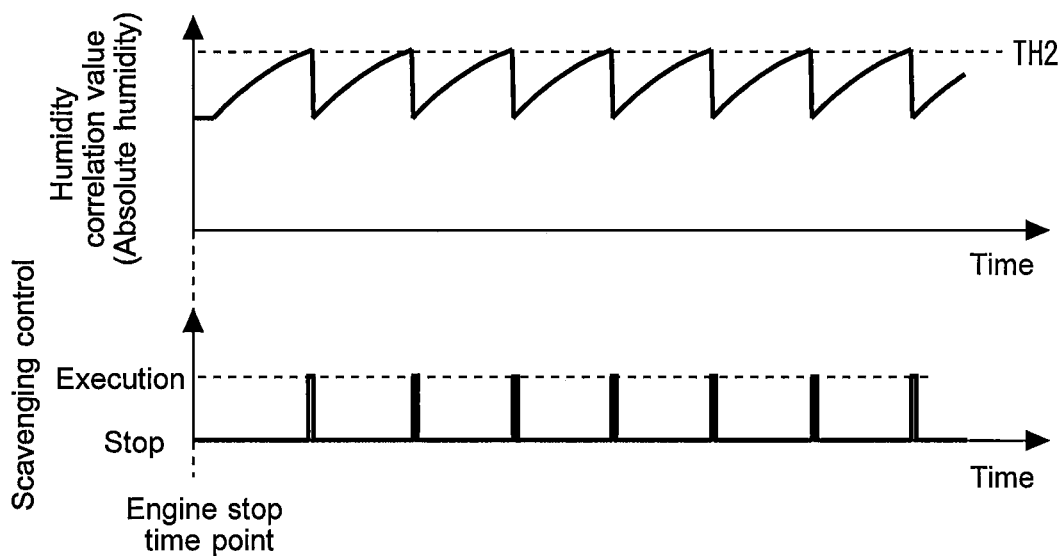
FIG. 5 is a time chart for describing an execution condition for a scavenging control according to a second embodiment of the present disclosure.

FIG. 5 is a time chart for describing the execution condition for the scavenging control according to the second embodiment of the present disclosure. If, after an engine stop, the temperature of the intercooler 34 increases to evaporate the condensed water inside the intercooler 34, the absolute humidity of the gas in the intercooler 34 increases as shown in FIG. 5.

Accordingly, according to the scavenging control of the present embodiment is started when the absolute humidity of the gas in the intercooler 34 detected by the humidity sensor 36 becomes higher than a threshold value TH2 (equivalent to a "humidity threshold value" according to the present disclosure).

If the scavenging control is executed, the absolute humidity of the gas in the intercooler 34 decreases as shown in FIG. 5. While the intercooler 34 has a high temperature that can promote the evaporation of the condensed water, the absolute humidity of this gas increases again similarly to the example shown in FIG. 5. According to the present embodiment, the scavenging control is repeatedly executed, as long as the execution condition (the absolute humidity of the gas in the intercooler 34>threshold value TH2) is met after an execution of the scavenging control.

Figure 6:
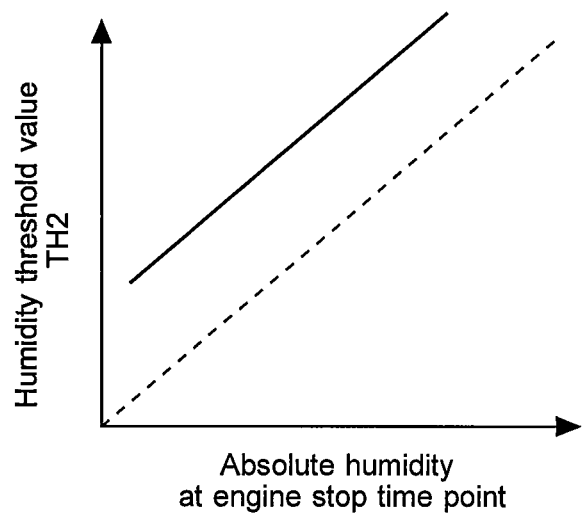
FIG. 6 is a graph that illustrates an example of the setting of a threshold value TH2 (humidity-threshold value) of the absolute humidity of a gas in an intercooler.

FIG. 6 is a graph that illustrates an example of the setting of the threshold value TH2 of the absolute humidity of the gas in the intercooler 34. As shown in FIG. 6, the threshold value TH2 is set so as to become higher than the absolute humidity of the gas in the intercooler 34 at the engine stop time point. According to the present embodiment, by the use of this kind of threshold value TH2, the scavenging control can be performed when the specified humidity condition described above is met after an engine stop.

2-1-2. Processing of ECU Concerning Scavenging Control

Figure 7:
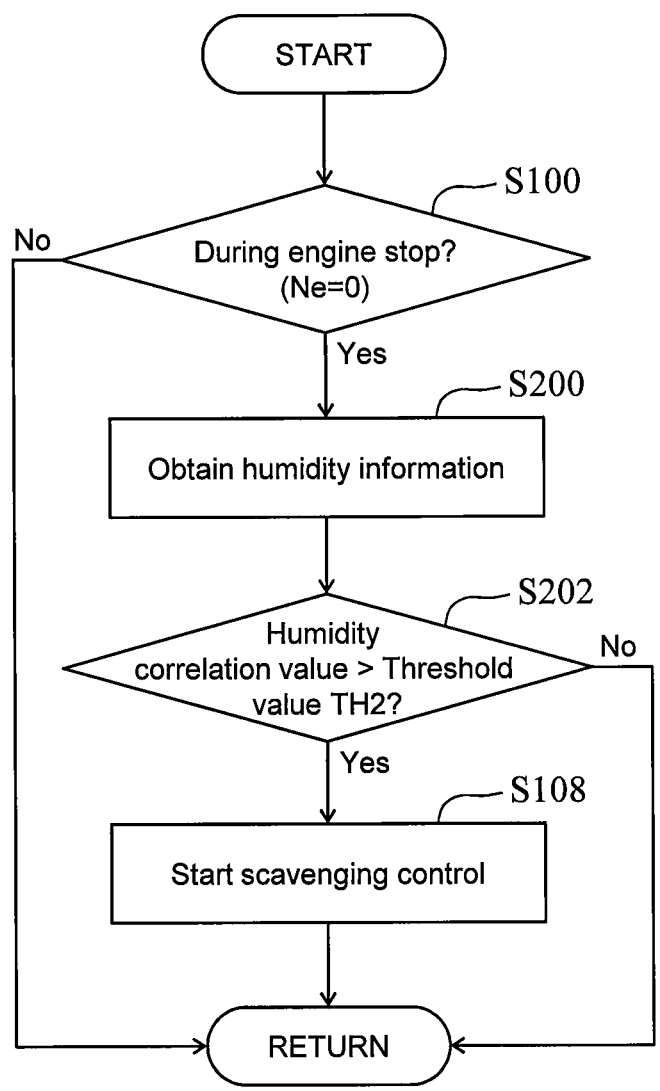
FIG. 7 is a flow chart that illustrates a routine of the processing concerning the scavenging control according to the second embodiment of the present disclosure.

FIG. 7 is a flow chart that illustrates a routine of the processing concerning the scavenging control according to the second embodiment of the present disclosure. The processing of steps S100 and S108 in the routine shown in FIG. 7 is as already described for the first embodiment.

According to the routine shown in FIG. 7, if the internal combustion engine 10 is in a stopped state (step S100: Yes), the ECU 80 proceeds to step S200. In step S200, the ECU 80 obtains a humidity information on the scavenging target portion. Specifically, the absolute humidity of the gas in the intercooler 34 is obtained by the use of the humidity temperature sensor 36.

Next, the ECU 80 determines whether or not the absolute humidity of the gas in the intercooler 34 that is obtained in step S200 is higher than or equal to the threshold value TH2 (step S202). The ECU 80 stores a map that defines a relationship as shown in FIG. 6, that is, a relationship between the absolute humidity of the gas in the intercooler 34 at the engine stop time point and the threshold value TH2. The ECU 80 obtains the threshold value TH2 depending on the absolute humidity at the engine stop time point from this kind of map. If the determination result of step S202 is negative, the ECU 80 ends the current processing cycle.

If, on the other hand, the determination result of step S202 becomes positive, the ECU 80 starts the scavenging control (step S108). According to the processing of the present routine, the scavenging control is repeatedly executed as long as the determination of step S202 is met during an engine stop.

2-1-3. Advantageous Effects of Scavenging Control

As described so far, the scavenging control according to the present embodiment is started when the absolute humidity of the gas in the intercooler 34 becomes higher than the threshold value TH2 (>the absolute humidity at an engine stop time point) after the engine stop. Thus, the scavenging control can be executed after confirming (grasping) that evaporation of the condensed water has proceeded due to a temperature increase of the intercooler 34 after the engine stop. Because of this, the condensed water that was already produced in the intercooler 34 before the engine stop can be effectively removed.

Figure 8:
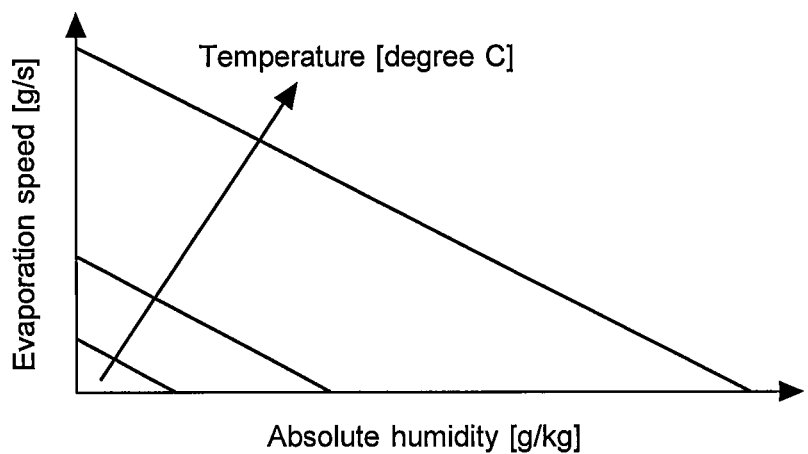
FIG. 8 is a graph that illustrates a relationship between the absolute humidity and temperature of the gas, and the evaporation speed of water.

Furthermore, as also represented in FIG. 8 described below, when the absolute humidity of the gas becomes higher under the same gas temperature, the evaporation speed of water decreases. In addition, as also represented in FIG. 2, there is a limitation in a time period in which a temperature increase that is effective to promotion of the evaporation of the water can be seen after an engine stop. In order to effectively evaporate and remove the condensed water in a temperature increase time period that is limited as just described, it would be favorable to repeatedly execute the scavenging control when a high evaporation speed is ensured. With regard to this point, according to the execution condition for the present embodiment described above, the scavenging control is started each time when a high humidity condition arrives. Therefore, the scavenging control can be repeatedly executed while highly maintaining the evaporation speed.

2-2. Modification Example Concerning Second Embodiment 2-2-1. Other Examples of Threshold Value TH2

FIG. 8 is a graph that illustrates a relationship between the absolute humidity and temperature of the gas, and the evaporation speed of water. The evaporation speed [g/s] of water (for example, condensed water that is attached to the wall surface of the intercooler 34) changes in accordance with the absolute humidity (more strictly, mass absolute humidity [g/kg]) and temperature [degree Celsius] of the gas at the water (for example, gas in the intercooler 34). In FIG. 8, three equal-temperature lines concerning the gas temperature are exemplified. Under the same gas temperature, the higher the absolute humidity is, the lower the evaporation speed becomes. In addition, under the same absolute humidity, the higher the gas temperature is, the higher the evaporation speed becomes.

Figure 9:
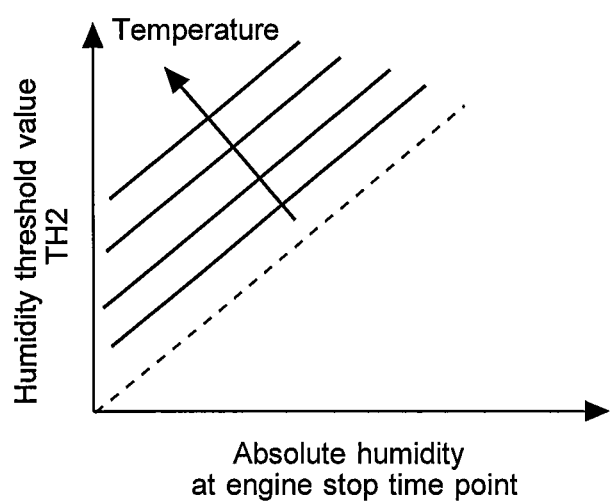
FIG. 9 is a graph that illustrates another example of the setting of the threshold value TH2 of the absolute humidity of the gas in the intercooler.

FIG. 9 is a graph that illustrates another example of the setting of the threshold value TH2 of the absolute humidity of the gas in the intercooler 34. In contrast to FIG. 6, the threshold value TH2 of this example is changed in accordance with the temperature of the gas in the intercooler 34 with taking into the relationship shown in FIG. 8. In more detail, according to the relationship shown in FIG. 8, the value of the absolute humidity that is able to maintain the same evaporation speed becomes higher when the gas temperature is higher. Accordingly, as shown in FIG. 9, when compared at the same condition that the absolute humidity of the gas at the engine stop time point is constant, the threshold value TH2 is set so as to become higher when the gas temperature is higher, than when the gas temperature is lower.

When comparing the absolute humidity with the threshold value TH2 in step S202 of the routine shown in FIG. 7, the ECU 80 may alternatively use the threshold value TH2 according to the relationship shown in FIG. 9, instead of the relationship shown in FIG. 6. As a result, whether or not the scavenging control should be started can be determined such that the scavenging control can be repeatedly executed while more appropriately maintaining high the evaporation speed, regardless of the magnitude of the gas temperature. It should be noted that the temperature used to make variable the threshold value TH2 is not limited to the gas temperature described above, as long as it corresponds to one of the temperature correlation values concerning the intercooler 34 that is a scavenging target portion of this scavenging control. That is, the threshold value TH2 may alternatively be similarly changed in accordance with the wall temperature of the intercooler 34 that is another example of the temperature correlation values.

2-2-2. Other Acquisition Example of Humidity Correlation Value (Example of Estimation of Absolute Humidity)

According to the second embodiment described above, the absolute humidity (i.e., humidity correlation value) of the gas in the intercooler 34 during an engine stop is acquired by the use of the humidity sensor 36. However, the humidity correlation value may alternatively be acquired by the use of, for example, an estimation method as described below.

According to this estimation method, an initial value (i.e., value at an engine stop time point) of the absolute humidity is, as an example, given as a value according to the EGR ratio that was used immediately before the engine stop and the outside air temperature at the engine stop time point. On that basis, a value R(k) of the absolute humidity during the engine stop is calculated for each predetermined time interval Δt. It Should be noted that, where a value R(1) is referred to as the initial value described above, the value R(k) means the absolute humidity calculated at the k-th time step.

Figure 10:
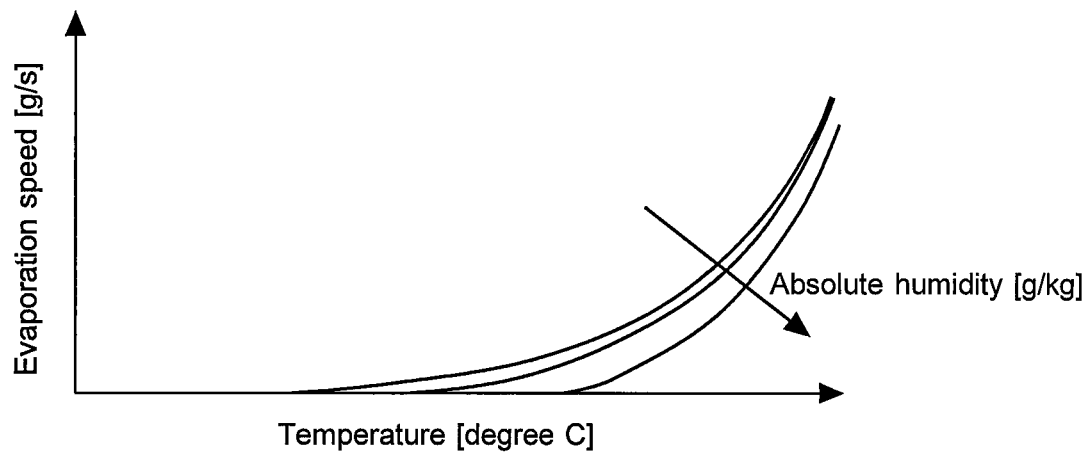
FIG. 10 is a graph that illustrates a relationship between temperature T and absolute humidity R of the gas, and the evaporation speed V of water.

FIG. 10 is a graph that illustrates a relationship between the temperature T and absolute humidity R of the gas, and the evaporation speed V of water. According to the present estimation method, the evaporation speed V(k) is calculated on the basis of the value R(k) of the absolute humidity, the temperature T(k) of the gas in the intercooler 34 at a calculation time point of this R(k), and the relationship shown in FIG. 10. It should be noted that the temperature used for this calculation may alternatively be the wall temperature of the intercooler 34, for example, instead of the temperature T of the gas described above.

Next, the evaporation speed V(k) calculated as described above is multiplied by the time interval Δt. Thus, an evaporation amount X(k) of the water during the time interval Δt is calculated. The absolute humidity R is represented as a value that is acquired by dividing the amount of water vapor inside the intercooler 34 by the mass of dry air inside the intercooler 34 (known value). A value R(k+1) of the absolute humidity at the next calculation timing (k+1) is calculated as a value that is acquired by adding the evaporation amount X(k) to the amount of the water vapor that is the numerator of a calculation formula of the value R(k). According to this kind of estimation method, the absolute humidity R during an engine stop can be estimated by sequentially adding, to the numerator of the absolute humidity R, the evaporation amount X that is calculated for each time interval Δt.

2-2-3. Other Example of Number of Executions of Scavenging Control

According to the processing of the routine shown in FIG. 7 described above, the scavenging control is repeatedly executed each time when the execution condition that the absolute humidity is higher than the threshold value TH2 during an engine stop is met. This makes it possible to more surely remove the evaporated water from the intercooler 34. However, the execution of the scavenging control based on the humidity information may alternatively be executed only one time when the execution condition described above is met after the engine stop. It should be noted that this kind of control example can be, for example, performed by replacing, with acquisition of the humidity information and a temperature determination according to the execution condition described above, the acquisition of the temperature information in step S104 and the temperature determination in step S106 of the routine shown in FIG. 4.

Third Embodiment

Next, a third embodiment according to the present disclosure and its modification example will be described with reference to FIGS. 11 and 12.

3-1. Control During Engine Stop According to Third Embodiment

A scavenging control according to the present embodiment is different from the scavenging control according to the first embodiment in terms of their execution conditions. Specifically, as described below in detail, the scavenging control according to the present embodiment is started when the temperature correlation value (water temperature) of the intercooler 34 becomes the highest after an engine stop.

3-1-1. Execution Condition for Scavenging Control (that Temperature Correlation Value Becomes Highest)

Figure 11:
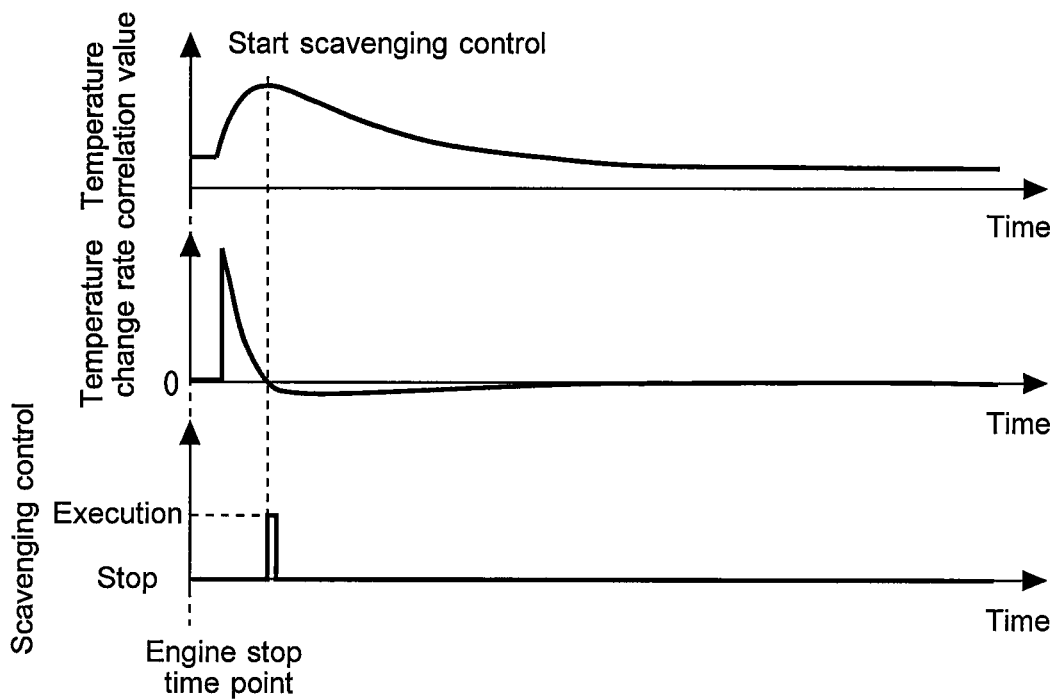
FIG. 11 is a time chart for describing an execution condition for a scavenging control according to a third embodiment of the present disclosure.

FIG. 11 is a time chart for describing the execution condition for the scavenging control according to the third embodiment of the present disclosure. As shown in FIG. 11, an increase of the temperature correlation value (water temperature) after an engine stop becomes gradually slower with a lapse of time, and the water temperature eventually shows a maximum value. Because of this, the temperature change rate (time change rate of the water temperature) starts decreasing after the engine stop, and becomes zero when the water temperature shows a maximum value, and shows a negative value in the process of the water temperature decreasing.

Accordingly, in the example shown in FIG. 11, the scavenging control is started when the temperature change rate has reached a value near zero after an engine stop. This makes it possible to start the scavenging control when the water temperature becomes the highest after the engine stop. Also in this kind of example, similarly to the first embodiment, the scavenging control can be executed when the specified temperature condition is met after the engine stop.

3-1-2. Processing of ECU Concerning Scavenging Control

Figure 12:
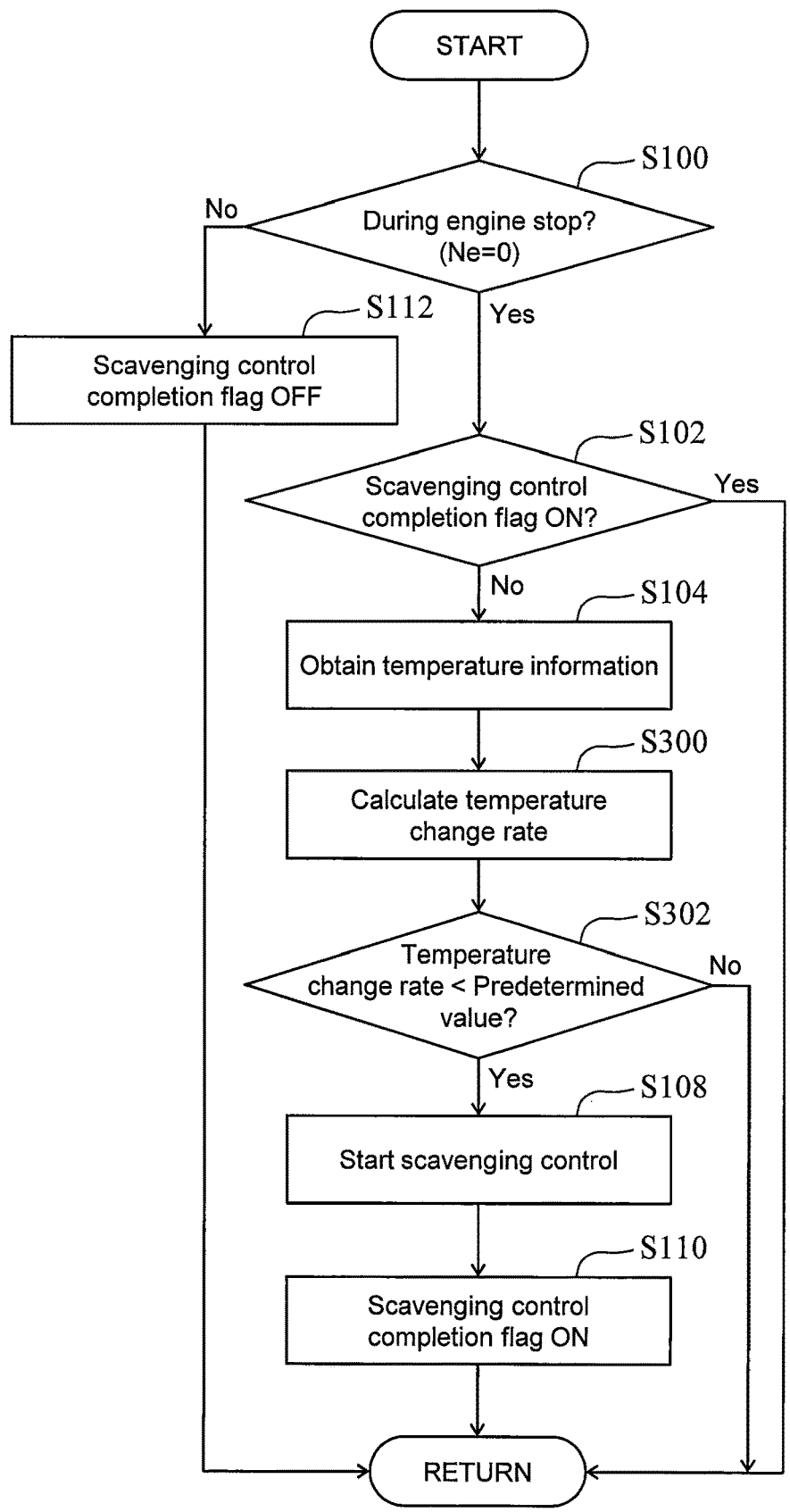
FIG. 12 is a flow chart that illustrates a routine of the processing concerning the scavenging control according to the third embodiment of the present disclosure.

FIG. 12 is a flow chart that illustrates a routine of the processing concerning the scavenging control according to the third embodiment of the present disclosure. The processing of steps S100 to S104 and S108 to S112 in the routine shown in FIG. 12 is as already described for the first embodiment.

According to the routine shown in FIG. 12, the ECU 80 proceeds to step S300 after obtaining the water temperature in step S104. In step S300, the ECU 80 calculates the temperature change rate (time change rate of the water temperature). For example, the difference between the current value of the water temperature obtained in step S104 and the last value thereof (=current value−last value) is calculated as the temperature change rate.

Next, the ECU 80 determines whether or not a calculated temperature change rate has become lower than a predetermined value (positive value near zero) (step S302). As a result, if the result of this determination is negative, the ECU 80 ends the current processing cycle.

If, on the other hand, the determination result of step S302 becomes positive, that is, if it can be judged that the temperature change rate has become the highest after an engine stop, the ECU 80 starts the scavenging control (step S108).

It should be noted that the temperature change rate described above shows a value near zero not only when the water temperature shows a maximum value but also when the water temperature converges to a certain value (outside air temperature) as shown in FIG. 11 (that is, when an engine soak is completed). According to the processing of the present routine, by the use of the processing of steps S102, S110 and S112, the scavenging control is no longer executed after the scavenging control completion flag is turned ON during an engine stop. The scavenging control can therefore be once executed only when the water temperature becomes the highest as a result of an increase of the water temperature immediately after the engine stop. However, in order to execute the scavenging control in this way, the water temperature obtained by the processing of step S104 may alternatively be, for example, limited to a value that is higher than or equal to a predetermined value (i.e., value to which the water temperature does not reach after the end of an increase of the water temperature seen after the engine stop), instead of the execution of the processing of steps S102, S110 and S112.

3-1-3. Advantageous Effects of Scavenging Control

As described so far, the scavenging control according to the present embodiment is executed when the temperature correlation value (water temperature) of the intercooler 34 becomes the highest after an engine stop. Also in this kind of example, the scavenging control can be executed after the evaporation of the condensed water in the intercooler 34 proceeds after the engine stop. Therefore, the condensed water that was already produced in the intercooler 34 before the engine stop can be removed effectively.

3-2. Modification Example Concerning Third Embodiment (Execution of Scavenging Control Based on Absolute Humidity)

After an engine stop, the absolute humidity of the gas in the intercooler 34 also shows a maximum value in association with the temperature of the intercooler 34 showing a maximum value. Accordingly, as an example of the execution of the scavenging control based on the specified humidity condition described above, the scavenging control according to the present disclosure may alternatively be started when the absolute value detected by humidity sensor 36 becomes the highest. The processing of the ECU 80 for this example can be, for example, performed by replacing, with acquisition of the humidity information using the humidity sensor 36, calculation of a humidity change rate and a humidity determination, the acquisition of the temperature information (step S104), the calculation of the temperature change rate (step S300) and the temperature determination (step S302) of the routine shown in FIG. 12.

Fourth Embodiment

Next, a fourth embodiment according to the present disclosure and its modification example will be described with reference to FIGS. 13 and 14.

4-1. Control During Engine Stop According to Fourth Embodiment

A scavenging control according to the present embodiment is different from the scavenging control according to the first embodiment in terms of their execution conditions. Specifically, as described below in detail, the scavenging control according to the present embodiment is started when a duration (hereunder, also referred to a "high temperature duration t1") in which the water temperature is higher than a threshold value TH3 (which corresponds to an example of the "second temperature-threshold value" according to the present disclosure) becomes longer than a threshold value TH4 (which corresponds to an example of the "first time-threshold value" according to the present disclosure).

4-1-1. Execution Condition for Scavenging Control (High Temperature Duration T1>Threshold Value TH4)

Figure 13:
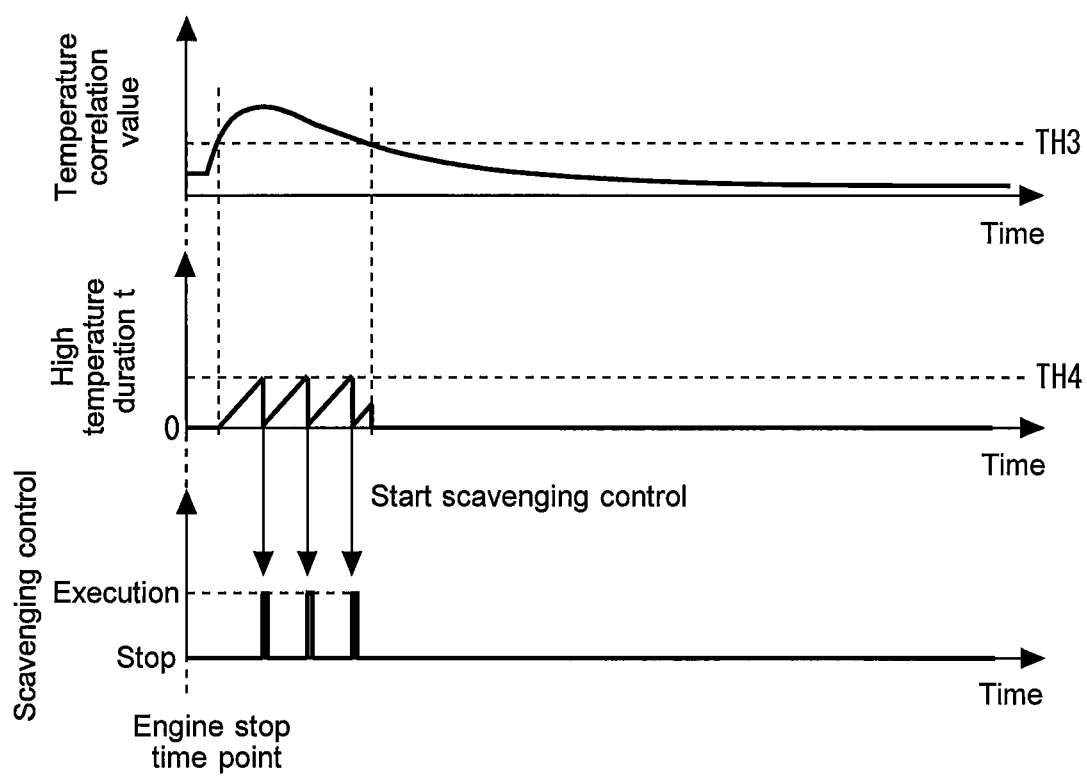
FIG. 13 is a time chart for describing an execution condition for a scavenging control according to a fourth embodiment of the present disclosure.

FIG. 13 is a time chart for describing the execution condition for the scavenging control according to the fourth embodiment of the present disclosure. As shown in FIG. 13, according to the present embodiment, when the water temperature exceeds the threshold value TH3 after an engine stop, the counting of the high temperature duration t1 by a counter of the ECU 80 is started. The threshold value TH3 is set so as to be higher than the water temperature at the engine stop time point, similarly to the threshold value TH1 for the first embodiment.

According to the example shown in FIG. 13, when the high temperature duration t1 reaches the threshold value TH4, the scavenging control is stated and the high temperature duration t1 is reset to zero. If the water temperature is higher than the threshold value TH3 when the high temperature duration t1 is reset, the counting of the high temperature duration t1 is newly started. Then, when the high temperature duration t1 reaches the threshold value TH4 again, the scavenging control is executed again. FIG. 13 shows an example in which this kind of scavenging control is performed three times. Also in this kind of example, similarly to the first embodiment, the scavenging control can be executed when the specified temperature condition is met after an engine stop.

4-1-2. Processing of ECU Concerning Scavenging Control

Figure 14:
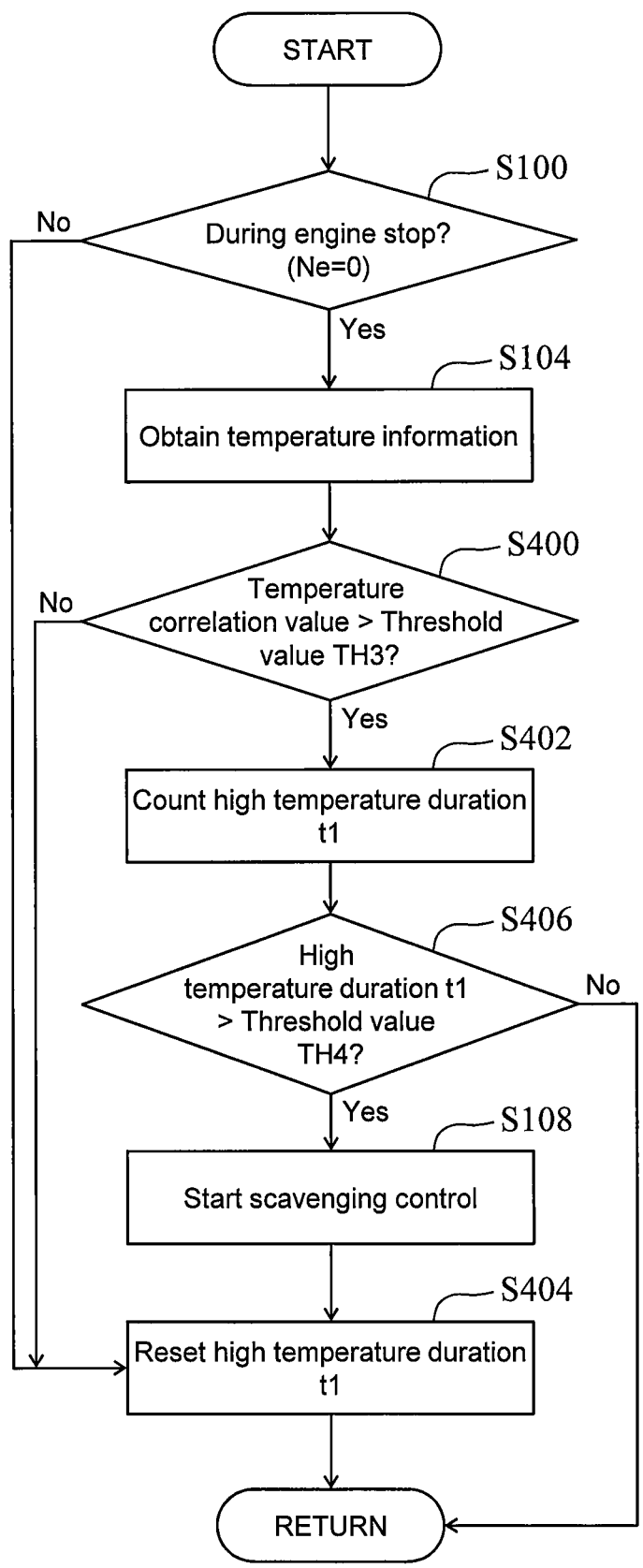
FIG. 14 is a flow chart that illustrates a routine of the processing concerning the scavenging control according to the fourth embodiment of the present disclosure.

FIG. 14 is a flow chart that illustrates a routine of the processing concerning the scavenging control according to the fourth embodiment of the present disclosure. The processing of steps S100, S104 and S108 in the routine shown in FIG. 14 is as already described for the first embodiment.

According to the routine shown in FIG. 14, if the internal combustion engine 10 is in a stopped state (step S100: Yes), the ECU 80 obtains the water temperature in step S104 and proceeds to step S400. In step S400, the ECU 80 determines whether or not the water temperature is higher than the threshold value TH3 (for example, 70 degrees Celsius). The threshold value TH3 can be obtained by the use of a manner similar to that for the threshold value TH1 in step S106.

If the determination result of step S400 is positive, the ECU 80 counts the high temperature duration t1 (step S402). To be more specific, if the processing proceeds to step S402 with the high temperature duration t1 being reset, the counting of the high temperature duration t1 is started, and, if, on the other hand, the counting of the high temperature duration t1 is already started, the counting is continued. In addition, if the determination result of step S400 is negative, the ECU 80 proceeds to step S404 and resets the high temperature duration t1 to zero.

Following the processing of step S402, the ECU 80 determines whether or not the current high temperature duration t1 is longer than the threshold value TH4 (for example, ten minutes) (step S406). The threshold value TH4 is determined in advance as a value for judging that the evaporation of the condensed water has properly proceeded after the water temperature exceeds the threshold value TH3. It should be noted that the evaporation is promoted more effectively when the temperature correlation value of the intercooler 34 is higher. Because of this, the threshold value TH4 may alternatively be, for example, changed so as to be shorter when the water temperature at the time of execution of step S406 is higher.

If the high temperature duration t1 has not yet reached the threshold value TH4 in step S406, the ECU 80 ends the current processing cycle. If, on the other hand, the determination result of step S406 becomes positive, that is, if the high temperature duration t1 has reached the threshold value TH4, the ECU 80 starts the scavenging control (step S108) and resets the high temperature duration t1 (step S404). It should be noted that, even if it is determined by the processing of step S100 that the internal combustion engine 10 is not in a stopped state, the high temperature duration t1 is reset.

4-1-3. Advantageous Effects of Scavenging Control

If the temperature of the intercooler 34 has increased after an engine stop, it takes a time to proceed the evaporation of the condensed water in association with an increase of the temperature. The scavenging control according to the present embodiment is not executed immediately when the water temperature exceeds the threshold value TH3 but is executed after the high temperature duration t1 reaches the threshold value TH4. According to this kind of processing, the scavenging control can be executed at a timing at which the evaporation of the condensed water associated with an increase of the temperature can be judged to have sufficiently proceeded. Thus, even in, for example, such a situation that a gap between a timing at which the water temperature exceeds the threshold value TH3 and a timing at which the evaporation has sufficiently proceeded is large due to the speed of the temperature increase being high, the scavenging control can be executed after properly ensuring the evaporation time.

4-2. Modification Example Concerning Fourth Embodiment (Other Example of Number of Executions of Scavenging Control)

If the scavenging control is performed several times during the execution condition according to the fourth embodiment being met (high temperature duration t1>threshold value TH4) similarly to the control according to the fourth embodiment described above, the condensed water that continuously evaporates can be removed more surely. However, the number of executions may alternatively be one, for example. It can be said that, during the first high temperature duration t1 after the water temperature exceeds the threshold value TH3 first, the amount of the condensed water is relatively great and thus, the amount of the condensed water that evaporates is also great. Because of this, it is conceivable that, according to one-time execution of the scavenging control, the condensed water can be efficiently removed while saving an energy (power consumption) required to the execution of the scavenging control. Therefore, the proceeding of the routine shown in FIG. 14 may alternatively be changed such that the scavenging control is not executed two times or more.

Fifth Embodiment

Next, a fifth embodiment according to the present disclosure and its modification example will be described with reference to FIGS. 15 and 16.

5-1. Control During Engine Stop According to Fifth Embodiment

5-1-1. Execution Condition for Scavenging Control (Engine Stop Time t2>Threshold Value TH5)

A scavenging control according to the present embodiment is different from the scavenging control according to the first embodiment in terms of their execution conditions. Specifically, as described below in detail, the scavenging control according to the present embodiment is started when an elapsed time (hereunder, referred to an "engine stop time t2") from an engine stop time point becomes longer than a threshold value TH5 (which corresponds to an example of the "second time-threshold value" according to the present disclosure).

The threshold value TH5 described above is determined in advance by, for example, an experiment, as a value that is required to ensure that the "specified temperature condition" is met when the engine stop time t2 is longer than this threshold value TH5. Thus, when the engine stop time t2 reaches the threshold value TH5 after an engine stop, it can be judged that, because of satisfaction of the specified temperature condition, the temperature correlation value that is correlated with the temperature of the intercooler 34 is higher than the temperature correlation value at the engine stop time point.

Figure 15:
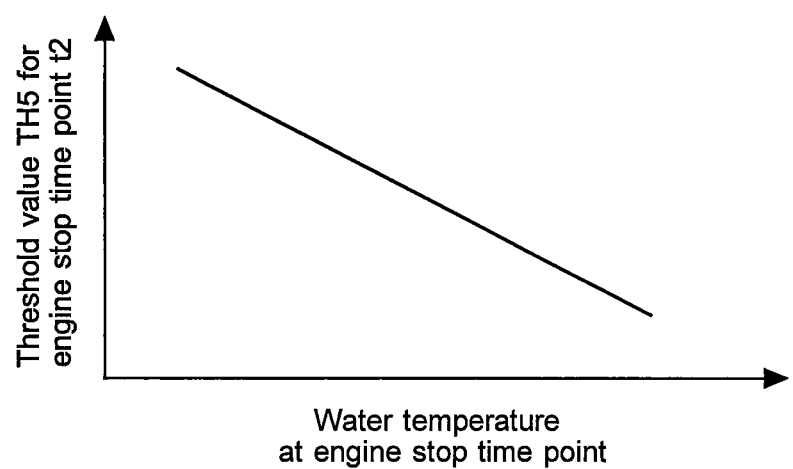
FIG. 15 is a graph that illustrates an example of the setting of a threshold value TH5 (second time-threshold value) for an engine stop time t2.

FIG. 15 is a graph that illustrates an example of the setting of the threshold value TH5 for the engine stop time t2. If the main body temperature of the internal combustion engine 10 at an engine stop time point becomes higher, the time of a temperature increase of the intercooler 34 and the time of the evaporation of the water proceeding in association therewith become earlier after the engine stop.

Accordingly, when a main body temperature correlation value (in this example, engine water temperature) that is correlated with the main body temperature of the internal combustion engine 10 at an engine stop time point is higher, the threshold value TH5 is set so as to be lower than when it is lower. In more detail, in the example shown in FIG. 15, the threshold value TH5 is set so as to be lower when the water temperature is higher.

According to the setting of the threshold value TH5 described above, the higher the water temperature at an engine stop time point is, the earlier the timing at which the scavenging control is started after the engine stop becomes. In this way, the start timing of the scavenging control according to the present embodiment is determined in consideration of the fact that the time of the proceeding of the evaporation of the water differs in accordance with the water temperature at the engine stop time point. Thus, regardless of the magnitude of the main body temperature at the engine stop time point, the scavenging control can be started at a more proper timing with regard to the proceeding of the evaporation of the water.

It should be noted that, instead of the engine water temperature used in the present embodiment, the main body correlation value described above may alternatively be, for example, an engine oil temperature or the temperature of the main body itself of the internal combustion engine 10 (for example, temperature of the cylinder block 14).

5-1-2. Processing of ECU Concerning Scavenging Control

Figure 16:
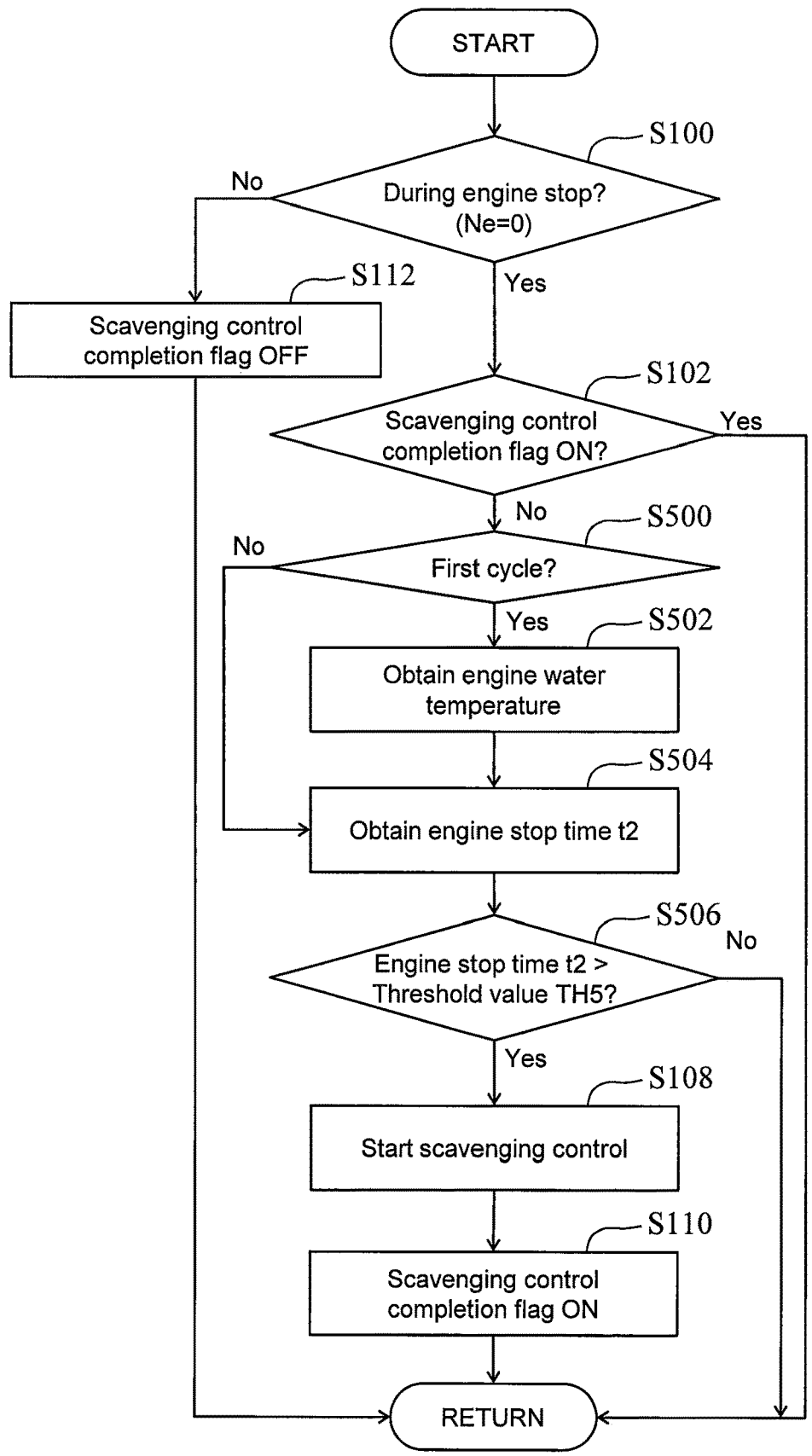
FIG. 16 is a flow chart that illustrates a routine of the processing concerning a scavenging control according to a fifth embodiment of the present disclosure.

FIG. 16 is a flow chart that illustrates a routine of the processing concerning the scavenging control according to the fifth embodiment of the present disclosure. The processing of steps S100, S102 and S108 to S112 in the routine shown in FIG. 16 is as already described for the first embodiment.

According to the routine shown in FIG. 16, if the scavenging control completion flag is not turned ON (step S102: No) during an engine stop (step S100: Yes), the ECU 80 proceeds to step S500. In step S500, the ECU 80 determines whether or not the current processing cycle is the first cycle after the engine stop.

As a result, if the determination result of step S500 is positive, the ECU 80 obtains, by the use of the engine water temperature sensor 84, the engine water temperature that is an example the main body correlation value (step S502). According to this kind of processing, the water temperature at the engine stop time point can be obtained. If, on the other hand, the determination result of step S500 is negative, that is, if the water temperature at the current engine stop time point has already been obtained, the ECU 80 proceeds to step S504.

In step S504, the ECU 80 obtains the engine stop time t2. Next, the ECU 80 determines whether or not an obtained engine stop time t2 is longer than the threshold value TH5 (step S506). The ECU 80 stores a map that defines a relationship between the water temperature at the engine stop time point and the threshold value TH5 as shown in FIG. 15, and obtains, from this kind of map, the threshold value TH5 depending on the water temperature at the engine stop time point.

As a result, if the ECU 80 determines in step S506 that the engine stop time t2 has not yet reached the threshold value TH5, it ends the current processing cycle. If, on the other hand, the ECU 80 determines that the engine stop time t2 has reached the threshold value TH5, it starts the scavenging control (step S108).

5-1-3. Advantageous Effects of Scavenging Control

Also according to the processing of the present embodiment that controls the start timing of the scavenging control by the use of the engine stop time t2, the scavenging control is started when the specified temperature condition is met. The scavenging control can therefore be executed at a timing at which the evaporation of the condensed water can be judged to be promoted due to a temperature increase. This makes it possible to effectively remove the condensed water that was already produced in the intercooler 34 before an engine stop.

5-2. Modification Example Concerning Fifth Embodiment (Other Setting Example of Second Time-Threshold Value)

In the fifth embodiment, the example in which the threshold value TH5 that corresponds to the "second time-threshold value" is determined as a value that is required to ensure that the "specified temperature condition" is met when the engine stop time t2 is longer than the threshold value TH5 has been described. However, the "second time-threshold value" according to the present disclosure may alternatively be determined as a value that is required to ensure that the "specified humidity condition" is met when the engine stop time t2 is longer than the second time-threshold value, instead of or in addition to the "specified temperature condition".

Sixth Embodiment

Next, a sixth embodiment according to the present disclosure will be described with reference to FIGS. 17 and 18.

6-1. Control During Engine Stop According to Sixth Embodiment 5-1-1. Execution Condition for Scavenging Control (Evaporation Speed Correlation Value<Threshold Value TH6)

A scavenging control according to the present embodiment is different from the scavenging control according to the first embodiment in terms of their execution conditions. Specifically, as described below in detail, the scavenging control according to the present embodiment is started when an "evaporation speed correlation value" that is correlated with the evaporation speed of the gas in the intercooler 34 becomes lower than a threshold value TH6 (which corresponds to an example of the "speed-threshold value" according to the present disclosure).

Figure 17:
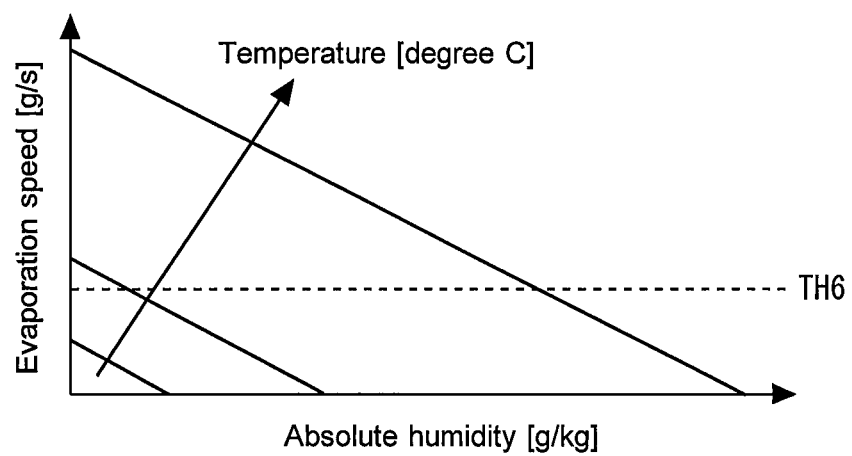
FIG. 17 is a graph for describing an execution condition for a scavenging control according to a sixth embodiment of the present disclosure.

FIG. 17 is a graph for describing the execution condition for the scavenging control according to the sixth embodiment of the present disclosure. FIG. 17 represents a relationship between the absolute humidity and temperature of the gas in the intercooler 34, and the evaporation speed of water, similarly to FIG. 8.

If the absolute humidity and temperature of the gas is known, the evaporation speed depending on the absolute humidity and temperature can be calculated by the use of the relationship shown in FIG. 17. According to the present embodiment, the evaporation speed itself calculated by the use of the relationship shown in FIG. 17 is used as an example of the evaporation speed correlation value described above. It should be noted that the temperature information used for this kind of method may alternatively be the wall temperature of the intercooler 34, instead of the gas temperature.

As already described with reference to FIG. 8, under the same gas temperature, the evaporation speed becomes lower when the absolute humidity is higher, and, under the same absolute humidity, the evaporation speed becomes higher when the gas temperature is higher. Thus, when the temperature of the gas in the intercooler 34 becomes higher after an engine stop, the evaporation speed becomes higher. As a result, the evaporation of the water is promoted. When the evaporation of the water proceeds thereafter and the absolute humidity becomes higher, the evaporation speed starts to decrease due to an increase of the absolute humidity.

The threshold value TH6 for the evaporation speed is determined in advance as a value that can judge that the evaporation speed has decreased due to an increase of the absolute humidity after an engine stop. Also, the threshold value TH6 is determined so as to be a value that is required to ensure that at least the specified humidity condition of the "specified temperature condition" and "specified humidity condition" is met when the evaporation speed becomes lower than the threshold value TH6.

6-2. Processing of ECU Concerning Scavenging Control

Figure 18:
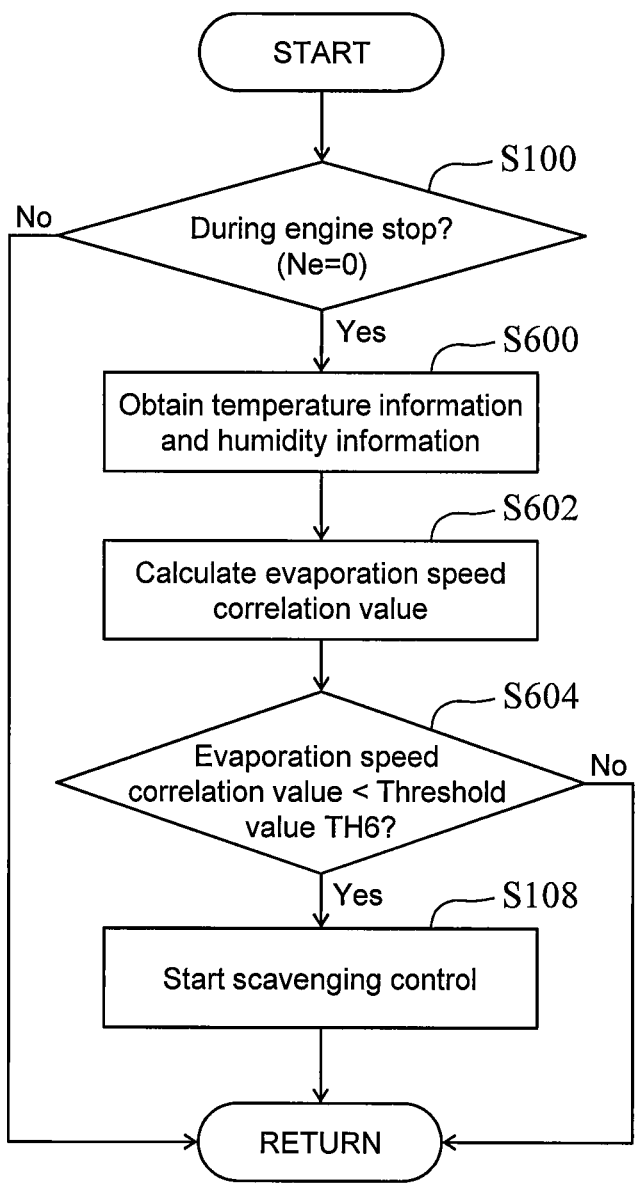
FIG. 18 is a flow chart that illustrates a routine of the processing concerning the scavenging control according to the sixth embodiment of the present disclosure.

FIG. 18 is a flow chart that illustrates a routine of the processing concerning the scavenging control according to the sixth embodiment of the present disclosure. The processing of steps S100 and S108 in the routine shown in FIG. 18 is as already described for the first embodiment.

According to the routine shown in FIG. 18, if the internal combustion engine 10 is in a stopped state (step S100: Yes), the ECU 80 proceeds to step S600. In step S600, the ECU 80 obtains the temperature information and the humidity information on the intercooler 34 that is a scavenging target portion. These temperature information and humidity information can be obtained by the processing of steps S104 and S200, for example.

Next, the ECU 80 calculates the evaporation speed correlation value (step S602). In detail, the evaporation speed itself that is an example of the evaporation speed correlation value is calculated using the following method. The ECU 80 stores a map that defines a relationship as shown in FIG. 17, that is, a relationship between the absolute humidity and temperature of the gas in the intercooler 34 and the evaporation speed of the water. The ECU 80 calculates, from this kind of map, the evaporation speed depending on the temperature information and the humidity information that are obtained in step S600.

Next, the ECU 80 determines whether or not a calculated evaporation speed correlation value is lower than the threshold value TH6 described above (step S604). As a result, if the determination result of step S604 is negative, the ECU 80 ends the current processing cycle.

If, on the other hand, the determination result of step S604 becomes positive, that is, if it can be judged that the evaporation speed has decreased due to an increase of the absolute humidity after an engine stop, the ECU 80 starts the scavenging control (step S108).

It should be noted that, according to the processing of the present routine, the scavenging control is repeatedly executed as long as the determination result of step S604 is positive during an engine stop. However, the processing may alternatively be changed such that the number of executions of the scavenging control becomes arbitrary.

6-3. Advantageous Effects of Scavenging Control

As described so far, the scavenging control according to the present embodiment is started when the evaporation speed (i.e., evaporation speed correlation value) becomes lower than the threshold value TH6 after an engine stop, that is, when the evaporation speed has decreased due to an increase of the absolute humidity after the engine stop. The scavenging control can thus be executed when, after proceeding of the evaporation of the water, the water becomes difficult to be evaporated, in other words, when it can be judged that the evaporation of the water has sufficiently proceeded. Therefore, the condensed water that was already produced in the intercooler 34 before the engine stop can be effectively removed.

Seventh Embodiment

Next, a seventh embodiment according to the present disclosure will be described with reference to FIG. 19.

7-1. Control During Engine Stop According to Seventh Embodiment 7-1-1. Outline of Scavenging Control A scavenging control according to the present embodiment is different from the scavenging control according to the first embodiment in terms of the following point. Specifically, the scavenging control according to the present embodiment is executed supplementarily when an engine stop is performed, in addition to when the execution condition according to the first embodiment (temperature correlation value>threshold value TH1) is met.

7-1-2. Processing of ECU Concerning Scavenging Control

Figure 19:
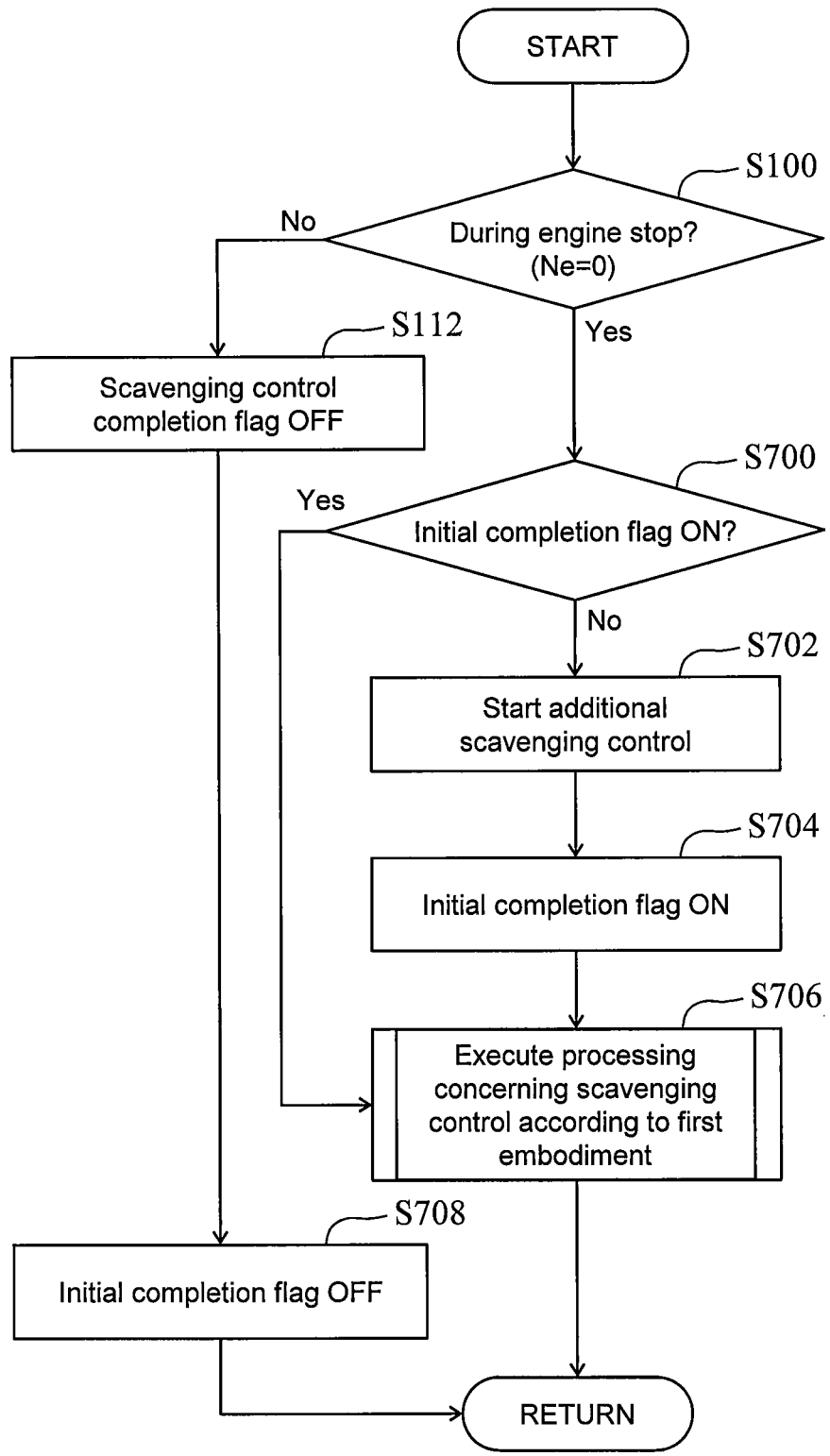
FIG. 19 is a flow chart that illustrates a routine of the processing concerning a scavenging control according to a seventh embodiment of the present disclosure.

FIG. 19 is a flow chart that illustrates a routine of the processing concerning the scavenging control according to the seventh embodiment of the present disclosure. The processing of steps S100 and S112 in the routine shown in FIG. 19 is as already described for the first embodiment.

According to the routine shown in FIG. 19, after determining in step S100 that an engine stop has been performed, the ECU 80 proceeds to step S700. In step S700, the ECU 80 determines whether or not an initial completion flag concerning the execution of the scavenging control is ON.

As a result, if the initial completion flag is not turned ON, the ECU 80 proceeds to step S702 and starts an supplemental scavenging control. The contents itself of this scavenging control is the same as the scavenging control by the processing of step S108. After executing the processing of step S702, the ECU 80 proceeds to step S704 to turn ON the initial completion flag.

After executing the processing of step S704, the ECU 80 proceeds to step S706. In addition, after determining in step S700 that the initial completion flag is ON, the ECU 80 also proceeds to S706.

In step S706, the ECU 80 executes a series of processing (steps S102 to S110 in FIG. 4) concerning the scavenging control according to the first embodiment. Thus, the scavenging control is executed (step S108 in FIG. 4), provided that the execution condition for the first embodiment is met (temperature correlation value>threshold value TH1). It should be noted that, if the internal combustion engine 10 is not in a stopped state, the ECU 80 turns OFF the scavenging control completion flag (step S112) and turns OFF the initial completion flag (step S708).

7-1-3. Advantageous Effects of Scavenging Control

As described so far, the scavenging control is supplementarily executed when an engine stop is performed, in addition to the execution based on the execution condition according to the first embodiment. It is expected at the engine stop time point that the absolute humidity in the scavenging target portion (in the present embodiment, intercooler 34) inside the internal combustion engine 10 is high. According to the present embodiment, the absolute humidity of the gas in the intercooler 34 can be decreased by removing, by the use of the supplemental scavenging control, the water that is present in a gas state at the engine stop time point. Also, the evaporation speed can be increased. On that basis, as a result of the scavenging control being executed thereafter, the water that evaporates in association with a temperature increase after the engine stop (i.e., the water that was already present as the condensed water in a liquid state before the engine stop) can be removed more effectively.

7-2. Modification Example (Other Example of Combination of Execution Conditions of Scavenging Control)

An initial scavenging control that uses, as its execution condition, a requirement that an engine stop have been performed may alternatively be executed in combination with the scavenging control according to the execution condition for any one of other second to sixth embodiments and their modification examples, instead of the scavenging control according to the execution condition of the first embodiment.

Eighth Embodiment

Next, an eighth embodiment according to the present disclosure will be described with reference to FIG. 20.

8-1. Control During Engine Stop According to Eighth Embodiment

8-1-1. Outline of Scavenging Control

A scavenging target portion according to the present embodiment is each portion of the EGR device 56 (more specifically, EGR passage 58, EGR valve 60 and EGR cooler 62). Thus, a scavenging control according to the present embodiment is different from the scavenging control according to the first embodiment in terms of actuator to be used, the temperature correlation value, and the execution time period of the scavenging control. It should be noted that, if the EGR valve 56 is used as the scavenging target portion, a part (for example, EGR cooler 62) of the EGR device 56 may alternatively be used instead of the example described above.

In detail, the actuator used for the scavenging control in the present embodiment is the EGR valve 60 in addition to the electrically-driven motor 88 and the throttle valve 38. That is to say, in order to generate a gas flow in the EGR passage 58 of the EGR device 56 that is the scavenging target portion, the scavenging control associated with opening of the EGR valve 60 is executed.

Also, since the scavenging target portion is the EGR device 56, the temperature correlation value used for the determination whether or not the execution condition is met is a value that is correlated with the temperature of the EGR device 56. Furthermore, the execution time period of the scavenging control corresponds to a predetermined time period required for the gas inside the EGR device 56 to be replaced with the fresh air (i.e., the air that is suctioned into the intake air passage 18 during execution of the scavenging control).

8-1-2. Processing of ECU Concerning Scavenging Control

Figure 20:
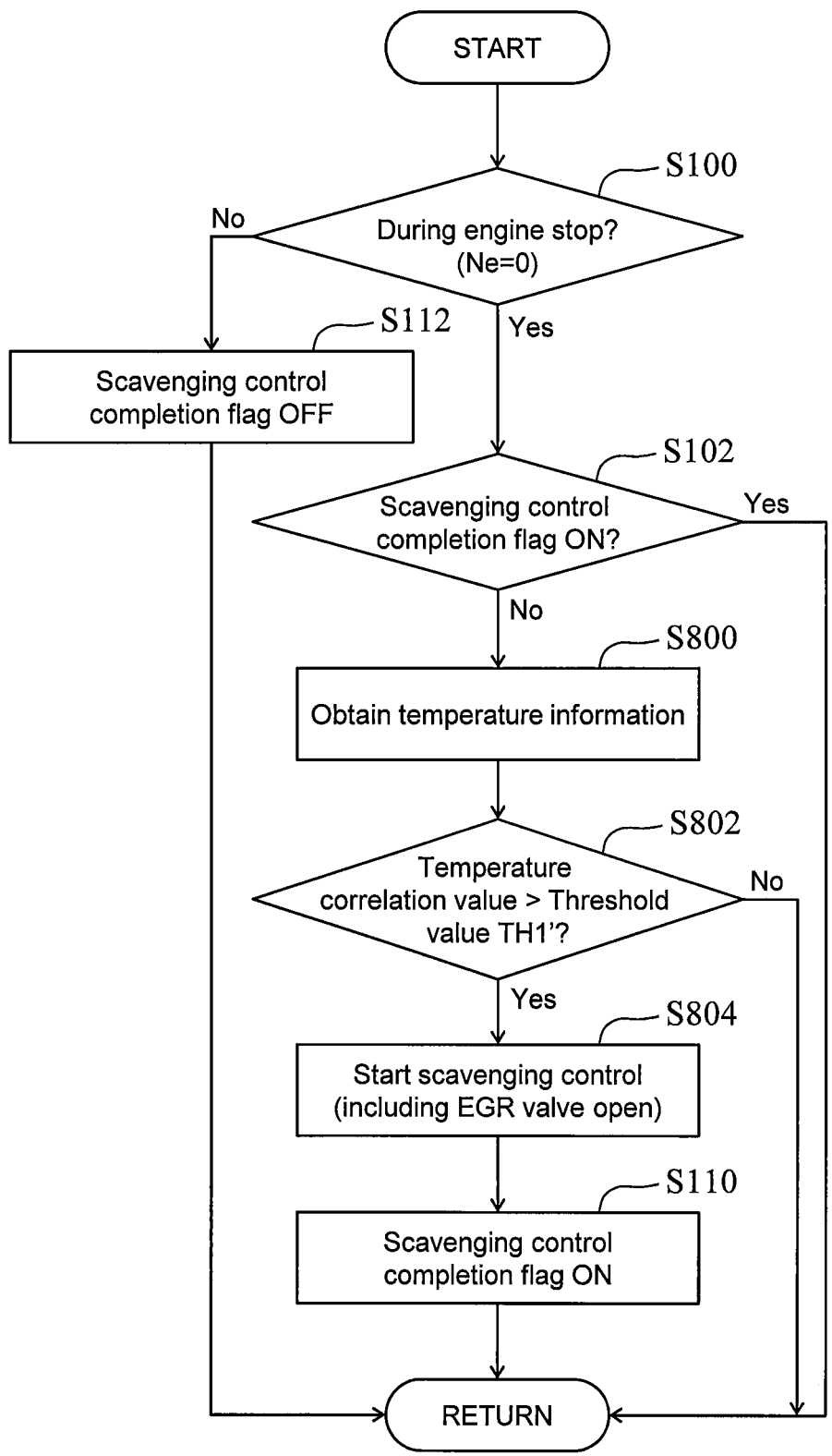
FIG. 20 is a flow chart that illustrates a routine of the processing concerning a scavenging control according to an eighth embodiment of the present disclosure.

FIG. 20 is a flow chart that illustrates a routine of the processing concerning the scavenging control according to the eighth embodiment of the present disclosure. The processing of steps S100, S102, S110 and S112 in the routine shown in FIG. 20 is as already described for the first embodiment.

According to the routine shown in FIG. 20, after determining in step S102 that the scavenging control completion flag is not turned ON, the ECU 80 proceeds to step S800. In step S800, the ECU 80 obtains the temperature information on the scavenging target portion (EGR device 56). The temperature correlation value obtained is the temperature of the gas in the EGR passage 58, for example. The temperature of this gas may alternatively be detected by the use of a temperature sensor, or be estimated by the use of an arbitrary estimation method. In addition, a value that is correlated with the temperature of the aforementioned gas, such as the engine water temperature, may alternatively be used as the temperature correlation value described above.

Next, the ECU 80 determines whether or not the temperature correlation value obtained in step S800 is higher than a threshold value TH1' (step S802). The method of the setting and acquisition of the threshold value TH1' is similar to that of the threshold value TH1. If the determination result of step S802 is negative, the ECU 80 ends the current processing cycle.

If, on the other hand, the determination result of step S802 becomes positive (temperature correlation value>threshold value TH1'), the ECU 80 proceeds to step S804. In step S804, the ECU 80 starts the scavenging control associated with the opening of the EGR valve 60 (for example, full opening degree).

8-1-3. Advantageous Effects of Scavenging Control

As described so far, according to the present embodiment, when the scavenging control is executed for the EGR device 56, the EGR valve 60 that affects a gas flow at the EGR device 56 that is the scavenging target portion is caused to open. A gas flow can thus be effectively generated with respect to the EGR device 56. As a result, the condensed water that has been present in the EGR device 56 since before an engine stop can be removed more efficiently by the use of a temperature increase after the engine stop.

8-2. Modification Example Concerning Eighth Embodiment (Other Example of Execution Condition for Scavenging Control)

The scavenging control that uses the EGR device 56 as the scavenging target portion and is associated with the opening of the EGR valve 60 may alternatively be executed in accordance with the execution condition for any one of other second to sixth embodiments and their modification examples, instead of the execution condition according to the first embodiment.

Other Embodiments

9-1. Other Examples of "Scavenging Target Portion"

Examples of the "scavenging target portion" according to the present disclosure are not limited to the intercooler 34 or the EGR device 56 described above, as long as the following three requirements are met. The three requirements are:

a requirement (1) that a "gas that flows through an internal combustion engine" be possible to flow;

a requirement (2) that a condensed water be possible to be present at an engine stop time point as a result of a condensed water being generated before the engine stop or a generated condensed water gathering before the engine stop; and a requirement (3) that a temperature increase be possible to be produced due to heat received from the main body of the internal combustion engine after the engine stop.

With regard to the requirement (1) described above, the "gas that flows through an internal combustion engine" is exemplified by intake air, exhaust gas, EGR gas and blow-by gas.

On the premise that the requirements (1) to (3) described above are met, other examples of the "scavenging target portion" include the intake ports 44, the cylinders 12, the exhaust system, and the positive crankcase ventilation system 64, in addition to the intercooler 34 (one example of heat exchangers) and the EGR device 56. Each of them corresponds to a portion at which a condensed water is generated during engine operation.

Moreover, other examples of the "scavenging target portion" include driving parts (such as, the intake and exhaust valves 50 and 52, the throttle valve 38, the PCV valve 72 and the ABV 32), and the intake manifold 40. Functions of these scavenging target portions are affected by corrosion or freezing due to the presence of the condensed water.

Moreover, the execution time period for the scavenging control in each of the examples of the scavenging target portions described above may be determined so as to be a predetermined time period that is required to replace the gas at a supposed scavenging target portion with the fresh air as described in the first embodiment. Also, if, similarly to the EGR valve 60 in the example of the EGR device 56 described above, there is a valve (such as, ABV 32) that is favorable to open so as to promote a gas flow at a scavenging target portion, the valve may be opened when the scavenging control is executed.

Furthermore, examples of the "temperature correlation value" that is correlated with the temperature of a designated scavenging target portion are as follows.

(a) Temperature of the scavenging target portion itself:
 for example, wall temperature.
(b) Temperature of a gas at the scavenging target portion:
 for example, various temperatures of intake air in an example of the intake air passage 18 being the scavenging target portion (such as, intake air temperature of an intake air inlet (i.e., in the air cleaner 22) or the temperature in the intake manifold 40)
(c) Temperature that increases in synchronization with a temperature increase of the scavenging target portion after an engine stop:
 for example, the engine water temperature, the engine oil temperature, the temperature of a gas in an engine compartment in which an internal combustion engine is installed, or the outside air temperature (which is limited to the temperature of a portion near the engine compartment)

It should be noted that these temperature correlation values may be detected by a temperature sensor or be estimated by the use of an arbitrary estimation method.

In addition, another example of the "humidity correlation value" that is correlated with the absolute humidity of a designated scavenging target portion is the absolute humidity of the gas itself at the scavenging target portion. Alternatively, the humidity correlation value may be an arbitrary value that is correlated with the absolute humidity of the gas, for example. This kind of humidity correlation value may be detected by a humidity sensor or be estimated by the use of an arbitrary estimation method as exemplified in FIG. 10.

9-2. Other Examples of Scavenging Control

The "scavenging control" according to the present embodiment may not always be executed by the use of the electrically-driven motor 88 and the throttle valve 38 described above, as long as it is executed by operating an actuator that is capable of generating a gas flow during a stop of an internal combustion engine and that causes the gas flow at a scavenging target portion. That is, the scavenging control may alternatively be executed as in various examples described below.

In detail, for example, the scavenging control may alternatively use, as the above-described actuator, an electrically-driven supercharger that is arranged in an intake air passage and be executed by operating the electrically-driven supercharger.

Moreover, for example, the scavenging control may alternatively use, as the above-described actuator, a pump that is arranged in a passage that communicates with a scavenging target portion and be executed by operating the pump.

Furthermore, a gas flow can be generated in an intake air passage by operating a radiator fan of a vehicle during an engine stop. Accordingly, for example, the scavenging control may alternatively use, as the above-described actuator, a radiator fan, and cause a gas flow to be generated in the intake air passage that includes a scavenging target portion.

In addition, in an internal combustion engine that includes a tank that stores a negative pressure or a supercharging pressure that is generated during operation of the internal combustion engine, the scavenging control may alternatively, for example, use, as the above-described actuator, a valve that opens and closes this tank, and cause a gas flow to be generated at a scavenging target portion.

The embodiments and modification examples described above may be combined in other ways than those explicitly described above as required and may be modified in various ways without departing from the scope of the present disclosure.

What is claimed is:

1. A vehicle control device for controlling a vehicle that includes an actuator capable of generating a gas flow at a scavenging target portion of an internal combustion engine during a stop of the internal combustion engine,
 the scavenging target portion being a portion in which: a gas that flows through the internal combustion engine is possible to flow; a condensed water is possible to be present at a stop time point of the internal combustion engine; and a temperature increase is possible to be produced due to heat received from a main body of the internal combustion engine after the stop of the internal combustion engine,
 wherein the vehicle control device is configured, when at least one of a specified temperature condition and a specified humidity condition is met after the stop of the internal combustion engine, to execute a scavenging control,
 wherein the specified temperature condition is that, after the stop of the internal combustion engine, a temperature correlation value correlated with a temperature of the scavenging target portion is higher than the temperature correlation value at the stop time point,
 wherein the specified humidity condition is that, after the stop of the internal combustion engine, a humidity correlation value correlated with an absolute humidity of a gas at the scavenging target portion is higher than the humidity correlation value at the stop time point, and
 wherein the scavenging control operates the actuator to cause the gas flow at the scavenging target portion.

2. The vehicle control device according to claim 1,
 wherein the vehicle control device is configured to start the scavenging control when, after the stop of the internal combustion engine, the temperature correlation value becomes higher than a first temperature-threshold value that is higher than the temperature correlation value at the stop time point.

3. The vehicle control device according to claim 1,
 wherein the vehicle control device is configured to start the scavenging control when, after the stop of the internal combustion engine, the humidity correlation value becomes higher than a humidity-threshold value that is higher than the humidity correlation value at the stop time point.

4. The vehicle control device according to claim 3,
 wherein, when compared under a condition that the humidity correlation value at the stop time point is constant, when the temperature correlation value is higher, the humidity-threshold value is higher than when the temperature correlation value is lower.

5. The vehicle control device according to claim 1,
 wherein the vehicle control device is configured to start the scavenging control when the temperature correlation value becomes the highest after the stop of the internal combustion engine.

6. The vehicle control device according to claim 1, wherein the vehicle control device is configured to start the scavenging control when the humidity correlation value becomes the highest after the stop of the internal combustion engine.

7. The vehicle control device according to claim 1, wherein the vehicle control device is configured to start the scavenging control when, after the stop of the internal combustion engine, a duration in which the temperature correlation value is higher than a second temperature-threshold value that is higher than the temperature correlation value at the stop time point becomes longer than a first time-threshold value.

8. The vehicle control device according to claim 1, wherein the vehicle control device is configured to start the scavenging control when, after the stop of the internal combustion engine, an elapsed time from the stop time point reaches a second time-threshold value at which at least one of the specified temperature condition and the specified humidity condition is met.

9. The vehicle control device according to claim 8, wherein, when a main body temperature correlation value that is correlated with a temperature of the main body of the internal combustion engine at the stop time point is higher, the second time-threshold value is shorter than when the main body temperature correlation value is lower.

10. The vehicle control device according to claim 1, wherein the vehicle control device is configured to start the scavenging control when an evaporation speed correlation value that is correlated with an evaporation speed of the gas at the scavenging target portion becomes lower than a speed-threshold value.

11. The vehicle control device according to claim 1, wherein the internal combustion engine includes an EGR device having an EGR passage that connects an exhaust gas passage with an intake air passage, and an EGR valve that opens and closes the EGR passage,
wherein a portion of the EGR device corresponds to the scavenging target portion,
wherein the actuator includes the EGR valve, and
wherein the vehicle control device is configured to open the EGR valve when executing the scavenging control.

* * * * *